United States Patent [19]

Hirahara et al.

[11] Patent Number: 5,099,259
[45] Date of Patent: Mar. 24, 1992

[54] HALFTONE IMAGE PRINTING DEVICE

[75] Inventors: Shuzo Hirahara, Yokohama; Hitoshi Nagato, Kawasaki; Kazuhiko Higuchi, Kawasaki; Kiyoshi Yamada, Chigasaki; Tadayoshi Ohno, Kawasaki; Tsutomu Kanai, Yokohama, all of Japan

[73] Assignee: Kabushiki Kaisha Toshiba, Kawasaki, Japan

[21] Appl. No.: 501,414

[22] Filed: Mar. 22, 1990

Related U.S. Application Data

[60] Division of Ser. No. 32,284, Mar. 31, 1987, abandoned, which is a continuation-in-part of Ser. No. 821,954, Jan. 24, 1986, Pat. No. 4,724,446.

[30] Foreign Application Priority Data

| Jan. 31, 1985 | [JP] | Japan | 60-16768 |
| Jun. 28, 1985 | [JP] | Japan | 60-142108 |
| Sep. 24, 1985 | [JP] | Japan | 60-208823 |
| Mar. 31, 1986 | [JP] | Japan | 61-72832 |

[51] Int. Cl.⁵ .................. G01D 15/10; H04N 1/22
[52] U.S. Cl. .................. 346/76 PH; 358/298
[58] Field of Search .................. 346/76 PH; 358/258

[56] References Cited

U.S. PATENT DOCUMENTS

| 3,922,484 | 11/1975 | Keller | 358/256 |
| 4,333,112 | 6/1982 | Matsumoto | 358/298 |
| 4,368,491 | 1/1983 | Saito | 358/283 |
| 4,394,693 | 7/1983 | Shirley | 358/298 |
| 4,412,225 | 10/1983 | Yoshida et al. | 346/1.1 |
| 4,531,160 | 7/1985 | Ehn | 358/240 |
| 4,532,523 | 7/1985 | Tanaka | 346/76 PH |
| 4,536,771 | 8/1985 | Tanaka | 346/76 PH |
| 4,578,713 | 3/1986 | Tsao et al. | 358/283 |
| 4,595,956 | 6/1986 | Kawamura et al. | 358/283 |
| 4,651,228 | 3/1987 | Koch | 358/298 |
| 4,668,978 | 5/1987 | Gokita | 358/78 |
| 4,724,446 | 2/1988 | Hirahara et al. | 346/76 PH |

FOREIGN PATENT DOCUMENTS

| 59-179363 | 10/1984 | Japan | 400/120 |
| 60-78768 | 5/1985 | Japan | 400/120 |

Primary Examiner—Benjamin R. Fuller
Assistant Examiner—Gerald E. Preston
Attorney, Agent, or Firm—Oblon, Spivak, McClelland, Maier & Neustadt

[57] ABSTRACT

A halftone image printing device for printing an image consisting of picture elements arrayed in a zig-zag fashioning. Each picture element is composed of dots forming a quasi-diamond-shaped matrix. The dot matrix is a 2 (row) x 3 (column) matrix with two additional dots located at the top and bottom, respectively. The range of optical density, within which the densities represented by the picture elements fall, is segmented into sub-ranges. Different heating-resistors are assigned to each sub-range of density. The dots printed by the heating-resistors assigned to any sub-range of density forms a "dot pattern" of a specific shape. The first dot pattern has one dot printed on the upper-central part of the rectangular matrix. The second dot pattern has three dots forming an L-shaped pattern, the first dot printed on the upper-central part of the matrix, the second dot printed above the first dot, and the third dot printed to the right of the first dot. The third dot pattern consists of five dots forming a cross, the first dot printed on the upper-central part of the matrix, the second dot printed above the first dot, the third dot printed to the right of the first dot, the fourth dot printed below the first dot, and the fifth dot printed to the left of the first dot. And the fourth dot pattern consists of five dots forming a cross and an additional dot printed immediately below the cross. Of the dots of each dot pattern, the dot on which energy concentrates more than any other dot assumes the same location for all dot patterns.

1 Claim, 31 Drawing Sheets

FIG. 2A    FIG. 2B    FIG. 2C
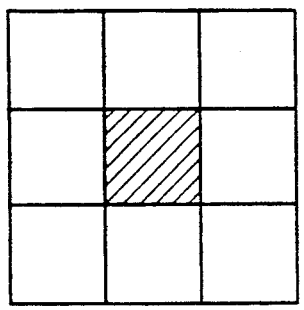 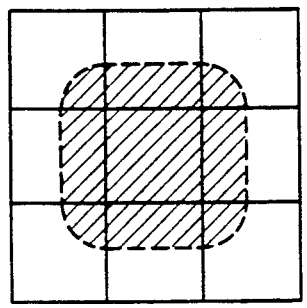 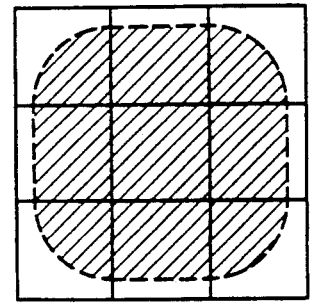
FIG. 3
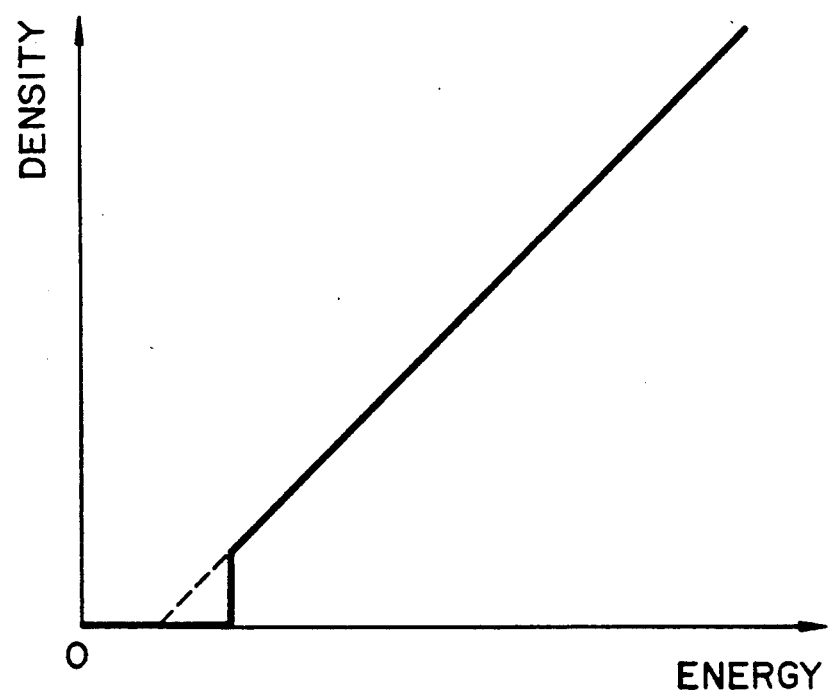

FIG. 6
| HALF-TONE GRADATION LEVEL | MULTI LEVEL DOT PATTERN |
|---|---|
| 0~4 | 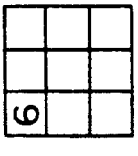 |
| 5~14 | 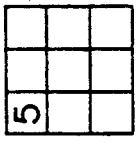 |
| 15~30 | 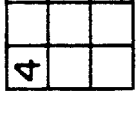 |

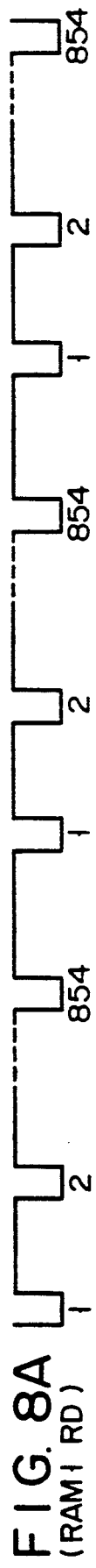
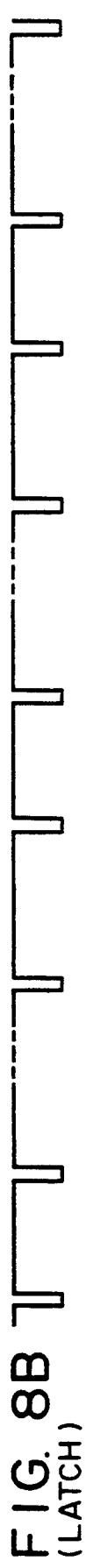
FIG. 8A (RAM1 RD)
FIG. 8B (LATCH)
FIG. 8C (RAM B1 WR)
FIG. 8D (LINE)
FIG. 8E (BIT)
FIG. 8F (RAM B2 WR)
FIG. 8G (RAM B1 RD)
FIG. 8H (RAM B2 RD)

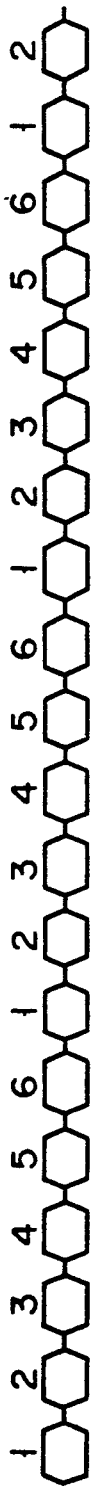
FIG. 10A (RAM B1 RD)
FIG. 10B (RAM B2 RD)
FIG. 10C (CLK)
FIG. 10D (LATCH)
FIG. 10E (EN 1)
FIG. 10F (EN 2)
FIG. 10G (DAT 1~4)

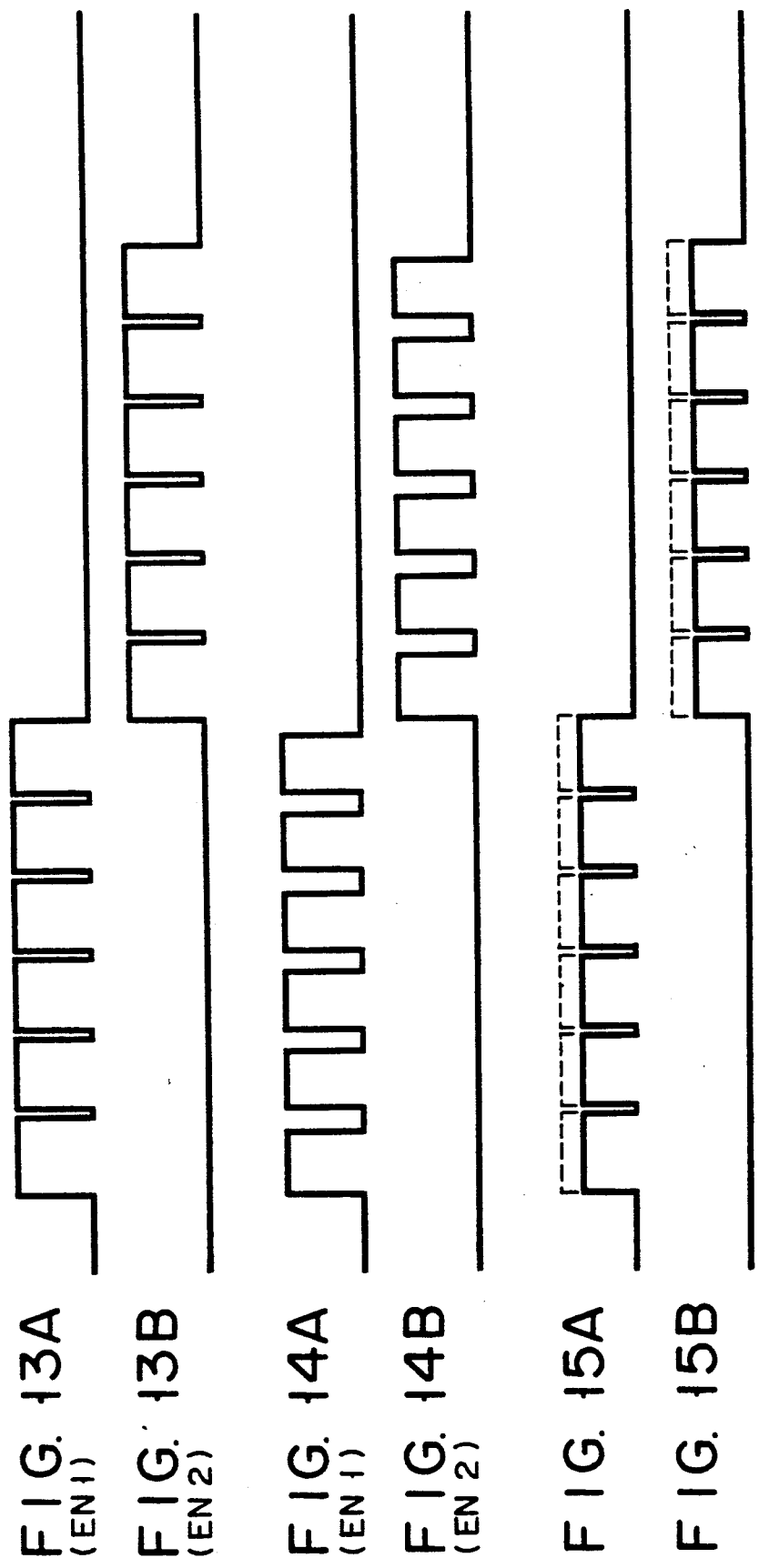

| GRADATION LEVEL | MULTI LEVEL DOT PATTERN |
|---|---|
| 0 ~ 6 | |
| 7 ~ 15 | |
| 16 ~ 30 | |
| 31 ~ 36 | |

F I G. 47
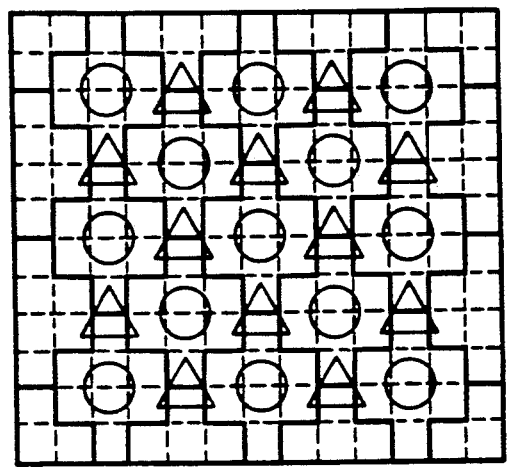
F I G. 48
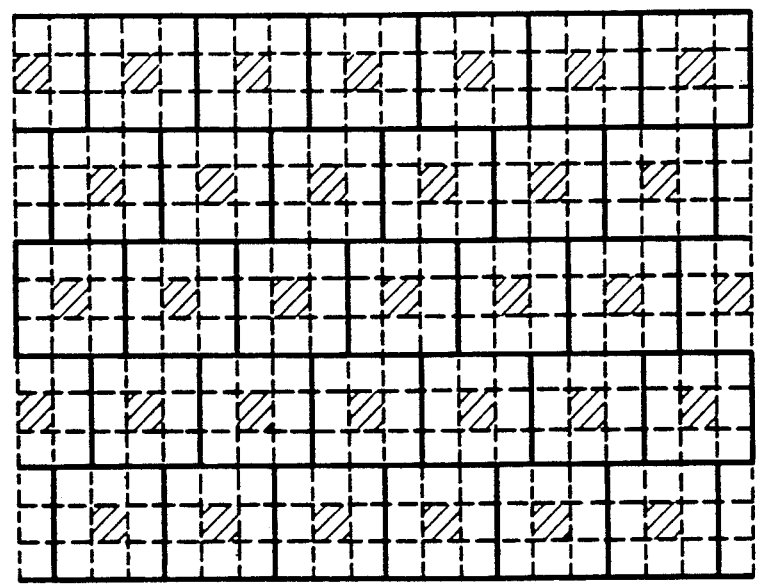

FIG. 50A
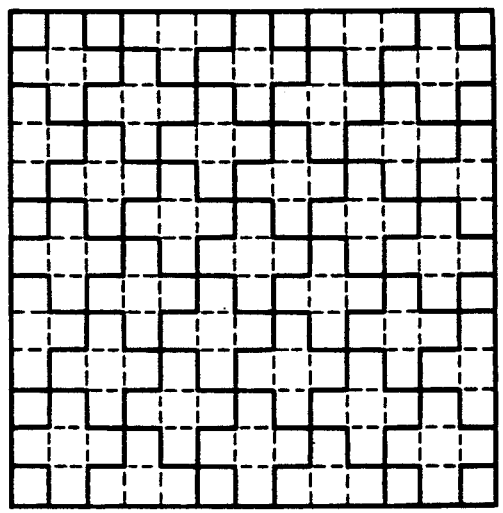
FIG. 50B
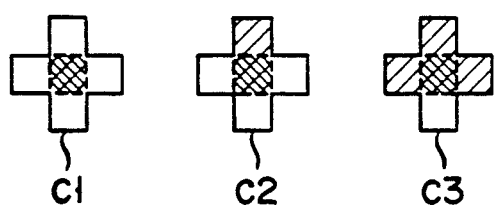

HALFTONE IMAGE PRINTING DEVICE

CROSS REFERENCE TO RELATED APPLICATION

This application is a division of application Ser. No. 032,284, filed on Mar. 31, 1989 abandoned, which is a continuation-in-part of Ser. No. 06/821,954 filed Jan. 14, 1986, U.S. Pat. No. 4,724,446.

BACKGROUND OF THE INVENTION

The present invention relates to a halftone image printing device, and, more particularly, to a halftone image printing device in which a pixel is formed by a plurality of dots in a matrix form, and can be printed in a halftone mode, or with gradation or gray levels.

In a halftone image printing device, a thermal head (printing head) is urged against printing paper through an ink film (normally having a ribbon-shape), and an ink on the ink film is melted by heat generated when heating resistors constituting the thermal head are energized. Thus, the melted ink is transferred to the printing paper so as to form a dot image corresponding to the energized resistors. In this apparatus, each dot can only be binary-controlled as to whether or not the ink is transferred. Therefore, in order to print a halftone image such as a picture, a so-called binary area modulation method is generally adopted. In this method, a pixel must correspond to a plurality of dots in a matrix form. The number of dots which are energized and subjected to ink transferring, however, changes in accordance with the density of a pixel. A DITHER method, a micro-font method or the like are well known as binary area modulation methods.

However, the number of levels able to be represented by this area modulation method is limited. When a pixel has an n×n dot matrix configuration, the number of levels expressed is $n^2+1$, including 0 level (the level of the printing paper). For example, in the case of a 4×4 dot matrix, 17 levels are provided. In general, a color image requires a resolution of 4 dots/mm or higher, and each color component requires 64 gray levels or more. In order to satisfy these requirements with the above-mentioned area modulation method, a pixel must be configured by an 8×8 dot matrix, and a thermal head having a resolution of 32 dots/mm or higher is needed. Although a thermal head having a resolution of 16 dots/mm has been developed, it is difficult to realize one having a resolution of 32 dots/mm or higher. For this reason, in this area modulation method, requirements for the number of gray levels and resolution cannot be satisfied, and it is impossible to perform halftone printing having a gradation that in both smooth and fine.

In a halftone image printing device, a portion designated to remain white in a high or medium density region may be colored due to heat pile-up of the thermal head. In contrast to this, an ink may not be transferred due to an insufficient amount of heat in a low density region. For this reason, a halftone image cannot be printed precisely.

SUMMARY OF THE INVENTION

It is an object of the present invention to provide a halftone image printing device capable of printing a halftone image without degrading resolution.

According to the present invention, there is provided a halftone image printing device in which one image is made up of a number of picture elements, each picture element including a predetermined number of dots combined into a specific matrix array, each picture element is printed in a dot pattern consisting of specific dots of those in the dot matrix, a dot pattern and an amount of energy to print a dot or dots of the dot pattern are controlled according to optical density levels of the picture element, in one dot row, which contains a dot with concentrated printing energy and two dot rows which are adjacent to said energy-concentrated dot-contained row, and also contain the energy-concentrated dots, the energy-concentrated dots of said respective rows are arrayed in different dot columns.

BRIEF DESCRIPTION OF THE DRAWINGS

FIGS. 2A to 2C are views showing the relationship between energy supplied to a printing head and the shape of a pixel formed to explain a principle of the first embodiment;

FIG. 3 is a graph showing the relationship between the energy supplied to the printing head in the first embodiment and an optical density of the pixel formed;

FIG. 6 is a table showing the relationship between the energy supplied to the printing head in the second embodiment and the halftone gradation level of the pixel formed;

FIGS. 8A to 8H are timing charts showing an operation of the multilevel dot pattern generator shown in FIG. 7;

FIGS. 10A to 10G are timing charts showing an operation of the thermal head driver shown in FIG. 9;

FIGS. 13A and 13B are signal waveform charts showing an energy amount supplied to a head when the thermal head is at a normal temperature;

FIGS. 14A and 14B are signal waveform charts indicating that energy supplied to the thermal head at a high temperature can be decreased by decreasing a pulse width to compare with that at a normal temperature;

FIGS. 15A and 15B are signal waveform charts indicating that energy supplied to the thermal head at a high temperature can be decreased by decreasing an amplitude of a signal to compare with that at a normal temperature;

FIG. 21 is a table showing the relationship between energy supplied to a printing head used in the third embodiment and a halftone gradation level of the pixel formed;

FIG. 44 shows a table illustrating multilevel dot patterns and graduation levels;

FIG. 47 shows a view illustrating the sampling operation of the halftone signal processing circuit of FIG. 5;

FIG. 48 shows a view illustrating an array of picture elements and an array of dots in each picture element, which are used in an eighth embodiment of a halftone image printing device according to this invention;

FIG. 49A shows dot patterns for four optical densities, which are used in the third embodiment of this invention;

FIG. 50A shows a matrix pattern of picture elements, which is used in a tenth embodiment of a halftone image printing device according to this invention;

FIG. 50B shows dot patterns for three optical densities which are used in the tenth embodiment of this invention;

DETAILED DESCRIPTION OF THE PREFERRED EMBODIMENTS

A halftone image printing device according to an embodiment of the present invention will be described with reference to the accompanying drawings.

A principle of the present invention will first be described. As described above, in a halftone image printing device, a pixel corresponds to m×n dots in a matrix form (a dot is the minimum unit of a heating member constituting a printing head and capable of transferring an ink). The density of each pixel corresponds to the total amount of ink transferred in a matrix dot region corresponding to each pixel. Only when the amount of heat from a head exceeds a certain threshold level is an ink transferred to paper; otherwise, no transfer is performed. Conventionally, energy supplied to a head is a constant value higher than the threshold level, and the amount of ink transferred per dot is constant, through control, irrespective of the heat pile-up of the head. However, the present invention is based on the fact that the degree of heat of each heating member is proportional to the area of the dot formed. Thus, a specific dot is selected irrespective of density, and energy supplied to the selected specific dot is changed in accordance with density so as to control the degree of heat generated by this dot, thereby changing the total amount of ink transferred per pixel in accordance with the density.

Figure 1:
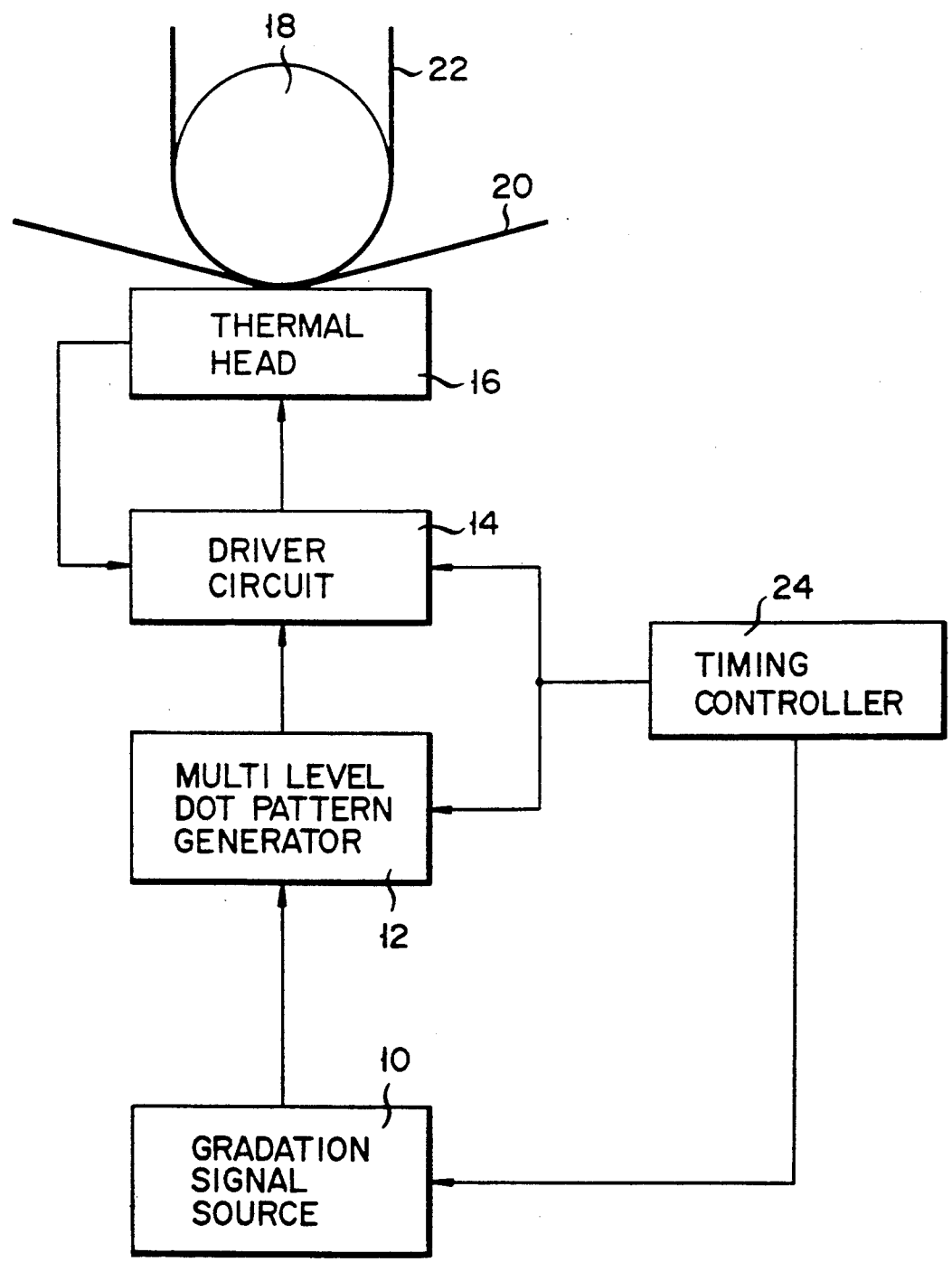
FIG. 1 is a block diagram showing a halftone image printing device apparatus according to a first embodiment of the present invention.

FIG. 1 is a block diagram showing an arrangement of a halftone image printing device according to a first embodiment of the present invention. An output from a gradation signal source 10 such as a memory is supplied to a multilevel dot pattern generator 12. Note that a gradation signal indicates the gray level of each pixel. The generator 12 generates a predetermined dot pattern for each pixel. Note that a pixel has an m×n dot matrix configuration, and a multilevel dot pattern constituted by specific dot therein is generated. That is, heating members corresponding to dots in this dot pattern are energized, the energization level (energy supply level) of each dot being controlled by the gradation signal. The thermal head 16 melts an ink while pressing printing paper 22 against the platen roller 18 through an ink ribbon 20, thereby transferring the ink onto the paper 22. A timing controller 24 for controlling various timings is connected to the gradation signal source 10, the multilevel dot pattern generator 12 and a driver circuit 14.

The operation of the first embodiment will be described. Note that, for the sake of simplicity, the generator 12 constitutes a pixel of a 3×3 dot matrix configuration, and generates a discrete dot pattern ("discrete" will be used as well as "single" hereinafter) of one dot at a central portion thereof. Energy supplied to each heating member is proportional to the amount of ink transferred to the printing paper. When a heating member of the head is energized at a low level, i.e., in the case of a low density level, a dot having a size corresponding to the heating member is formed on the printing paper, as shown in FIG. 2A. When the heating member of the head is energized at a medium level, i.e., in the case of a medium density level, a dot slightly larger than the size of the heating member is formed on the printing paper, as shown in FIG. 2B. When the heating member of the head is energized at a high level, i.e., in the case of a high density level, a dot considerably larger than the size of the heating member is formed on the printing paper, as shown in FIG. 2C.

For this reason, the energy supply level of the heating member and the optical density of a pixel can be controlled as shown in FIG. 3. When the energy supply level is smaller and lower than the threshold energy level required for the optimal transfer of ink, it is uncertain whether or not ink transfer has been performed. Therefore, since the optical density is also uncertain, a characteristic curve is indicated by a broken line.

According to the first embodiment, the energization level of the thermal head is determined in accordance with the gradation signal, and, as a result, a proper amount of ink corresponding to the density is transferred to the printing paper, thus printing each pixel in a halftone mode.

Note that in the first embodiment, only a discrete dot in 3×3 dots is used so as to provide halftone printing in accordance with a change in the energy supply level of the specific dot. However, a density may not satisfactorily be controlled by only the change in the energy supply level of the specific dot, and an embodiment solving this problem will be described hereinafter.

Figure 4A:
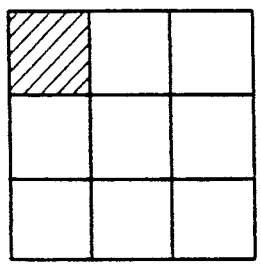
FIGS. 4A to 4C are views showing multilevel dot patterns, in respective density ranges, used for driving a printing head in a second embodiment.
Figure 4B:
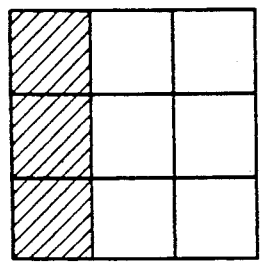
Figure 4C:
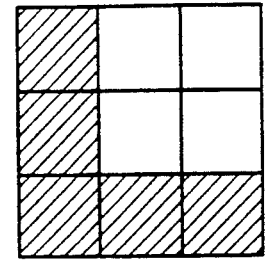
Figure 5:
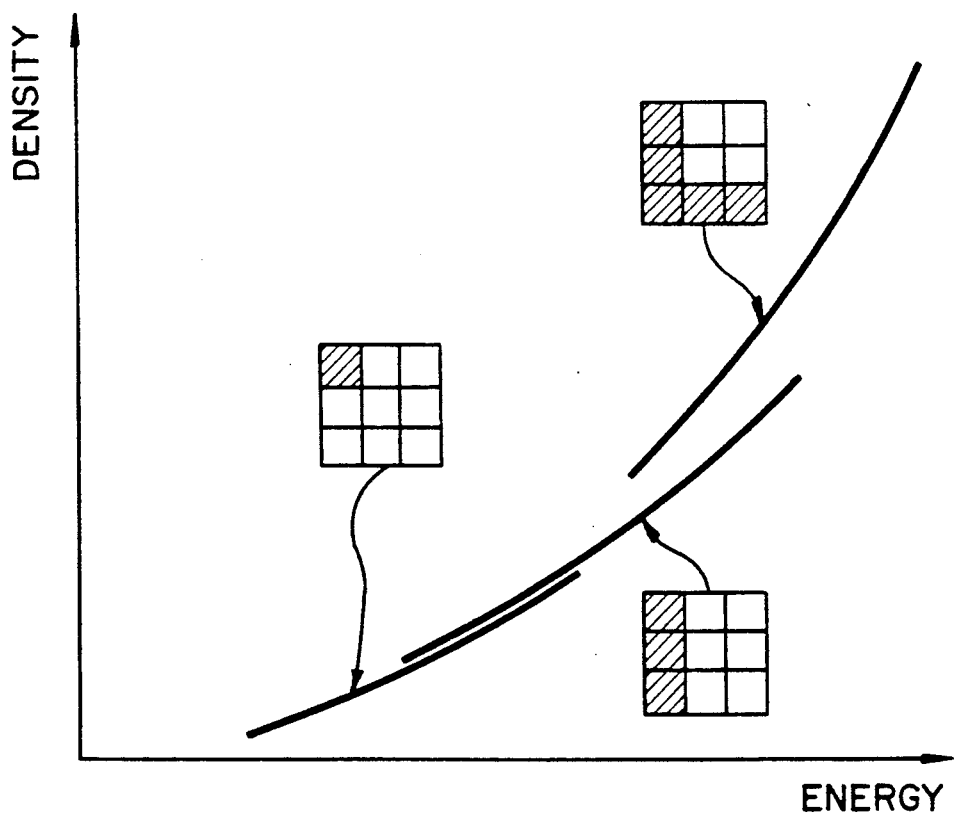
FIG. 5 is a graph showing the relationship between energy supplied and an optical density of a pixel formed when the printing head is driven in accordance with the multilevel dot patterns shown in FIGS. 4A to 4C.

In a second embodiment in which the above problem is solved, the total optical density range is divided into three ranges, with specific dot patterns being assigned to respective density ranges. A block diagram of the second embodiment is substantially the same as that of the first embodiment shown in FIG. 1, except that the generator 12 constitutes a pixel of a 3×3 dot matrix, and generates a dot pattern (discrete dot pattern) constituted of one dot at an upper left corner, as shown in FIG. 4A, in a low density range; a dot pattern (stripe pattern) constituted by three dots included in a leftmost column, as shown in FIG. 4B, in a medium density range; and a dot pattern (L-shaped dot pattern) constituted by five L-shaped dots included, in a high density range, in the leftmost column of the lowermost row. Note that the vertical and lateral directions of each pattern correspond to a vertical movement and/or sub-scanning direction of the printing paper, and a lateral head heating member alignment and/or main scanning direction, respectively. The energy supply level of the heating member is varied in each pattern in accordance with a gradation signal, as in the first embodiment. In the low density range, the size (diameter) of a dot pattern transferred to the printing paper is changed in accordance with a change in the energy supply level of the heating member, thus also changing the density. In the medium density range, the size (width) of a stripe pattern transferred to the printing paper is changed in accordance with the change in the energy supply level of the heating member, thus also changing the density. In the high density range, an area of a 2×2 dot white portion other than an L-shape is changed in accordance with the change in the energy supply level of the heating member. In this case, the optical density ranges which can be indicated by changing the energy supply level of the heating member, partially overlap each other. A lower curve in FIG. 5 indicates characteristics of the discrete dot pattern of FIG. 4A, a middle curve in FIG. 5 indicates characteristics of the stripe pattern of FIG. 4B, and an upper curve in FIG. 5 indicates characteristics of the L-shaped pattern of FIG. 4C.

FIG. 6 shows an energy supply level of each dot corresponding to each halftone gradation level. In the second embodiment, the overall density is divided into 31 levels, the discrete dot pattern represents 0 to 4 halftone gradation levels (optical density), the stripe pattern represents 5 to 14 halftone gradation levels, and the L-shaped pattern represents 15 to 30 halftone gradation levels. In this manner, according to the second embodiment, a pixel of a 3×3 dot matrix can provide 31 levels. In a conventional area modulation methods such as a DITHER method, a pixel of a 3×3 dot matrix can provide only 10 levels. Therefore, the number of gradation levels can be greatly increased in the present invention.

Each dot pattern used in the second embodiment has the following advantages.

(1) The dot pattern including a stripe perpendicular to a dot array of the printing head (which is constituted by a heating member array aligned along a lateral direction of the printing paper) can print a smooth pattern. The predetermined dots are continuously energized, such that the gradient of heat-diffusion becomes steep and the edge of the printed pattern becomes stable.

(2) Since each dot pattern has a white portion of 2×2 dots or more, a portion to be whitened cannot be arbitrarily blackened, and stable gradation with less noise can be obtained. This performance was confirmed by a head having a resolution of up to 16 dots/mm.

(3) When an energy supply level is changed in the same dot pattern, the printing density increases linearly with respect to an increase in the average energy per dot. That is, the density can be controlled in an analog manner. If the number of control levels are enlarged, a large of gradation number can be obtained.

(4) In advantage (3), the higher the resolution of the printing head becomes, the weaker a pattern dependency becomes. Therefore, density characteristics cannot differ from their respective patterns. The energy supply level also increases linearly with respect to an optical density, even if the dot pattern is changed.

Figure 7:
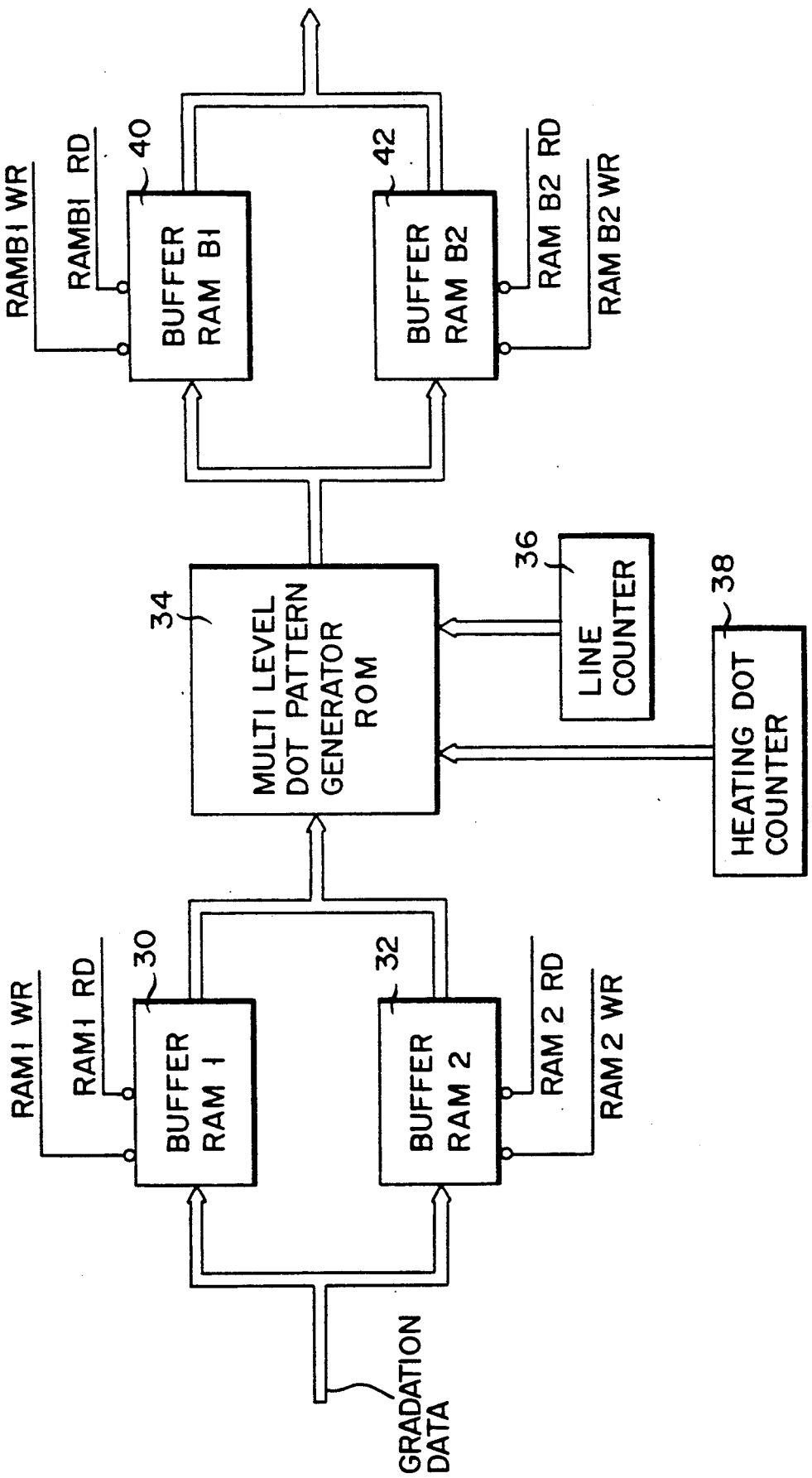
FIG. 7 is a block diagram showing a multilevel dot pattern generator shown, in detail in FIG. 1.

The second embodiment will be described in more detail hereinafter. Assume, for the sake of description, that a pixel has 3×3 dots. FIG. 7 is a block diagram showing the multilevel dot pattern generator 12 in detail. Gradation data (8 bits) from the gradation signal source 10 is supplied to a buffer (RAM1) 30 and a buffer (RAM2) 32. This is to complete data supply from the signal source 10 by one operation per line. If the gradation data is not supplied to buffers 30 and 32, since the gradation data only gives one level to a pixel of 3×3 dots, the same gradation data from the signal source 10 must be supplied three times per every line. The buffers RAM1 and RAM2 have a capacity of 8 bits×854. Note that the printing head is a 2,560-dot head having 2,560 heating members aligned along the main scanning direction (since the printing paper is moved along the vertical direction in this case, the main scanning direction corresponds to the lateral direction of the paper). Since a pixel has 3×3 dots, bits of the smallest integer larger than 2,560/3, i.e., 854 bits are required. The two buffers 30 and 32 allow for high speed printing. Data in the first line (three lines in practice, because a pixel has 3×3 dots) is written into the buffer RAM1, and the data in the next line is written into the buffer RAM2. Data in the following lines are alternately written into the buffers RAM1 and RAM2. Thus, while data is written into one buffer, data can be read out from the other buffer. When data write of one line data in the buffer RAM1 or RAM2 is completed, the buffer RAM1 or RAM2 is set in a standby state. When printing of 3 line data constituting a pixel is completed, a data readout signal RAM1RD or RAM2RD is generated, and the data at the second line is read out from the buffer RAM1 or RAM2. Thereafter, this operation is repeated until printing for one page is completed (in the case of color printing, until printing for one color is completed). Assuming that the printing cycle is 2 msec/line, it requires 6 msec to read out data of one pixel line.

The same dot pattern is generated three times from the buffers RAM1 and RAM2. In response to the signal RAM1RD, data in the buffer RAM1 is read out, and the readout data is supplied to a multilevel dot pattern generator ROM 34. (The generator 34 can comprise a RAM.) Multilevel dot pattern data (6 bits) in the ROM 4, indicated by the input data, an output from a line counter 36 (2 bits) and an output from a heating dot counter 38 is serially generated, and is stored in a buffer (RAMB1) 40 and a buffer (RAMB2) 42. This data indicates the energy supplied to each heating member of the printing head. The counters 36 and 38 repeatedly generate data "0", "1" and "2", indicating which data is to be read out from the 3×3 dot matrix. The buffer (RAMB1) 40 and the buffer (RAMB2) 42 have a capacity of 6 bits×2,560, and are provided for two lines for the purpose of high speed driving. Data for one line (854 words) is read out from the RAM1, and is converted into dot pattern data indicating an energization energy level. When all the data (2,560 words) are written in the RAMB1, the RAMB1 is switched to the standby state. During this operation, data is read out from the other RAMB2 so as to perform one line printing.

FIGS. 8A to 8H show the above operation as a timing chart.

Figure 9:
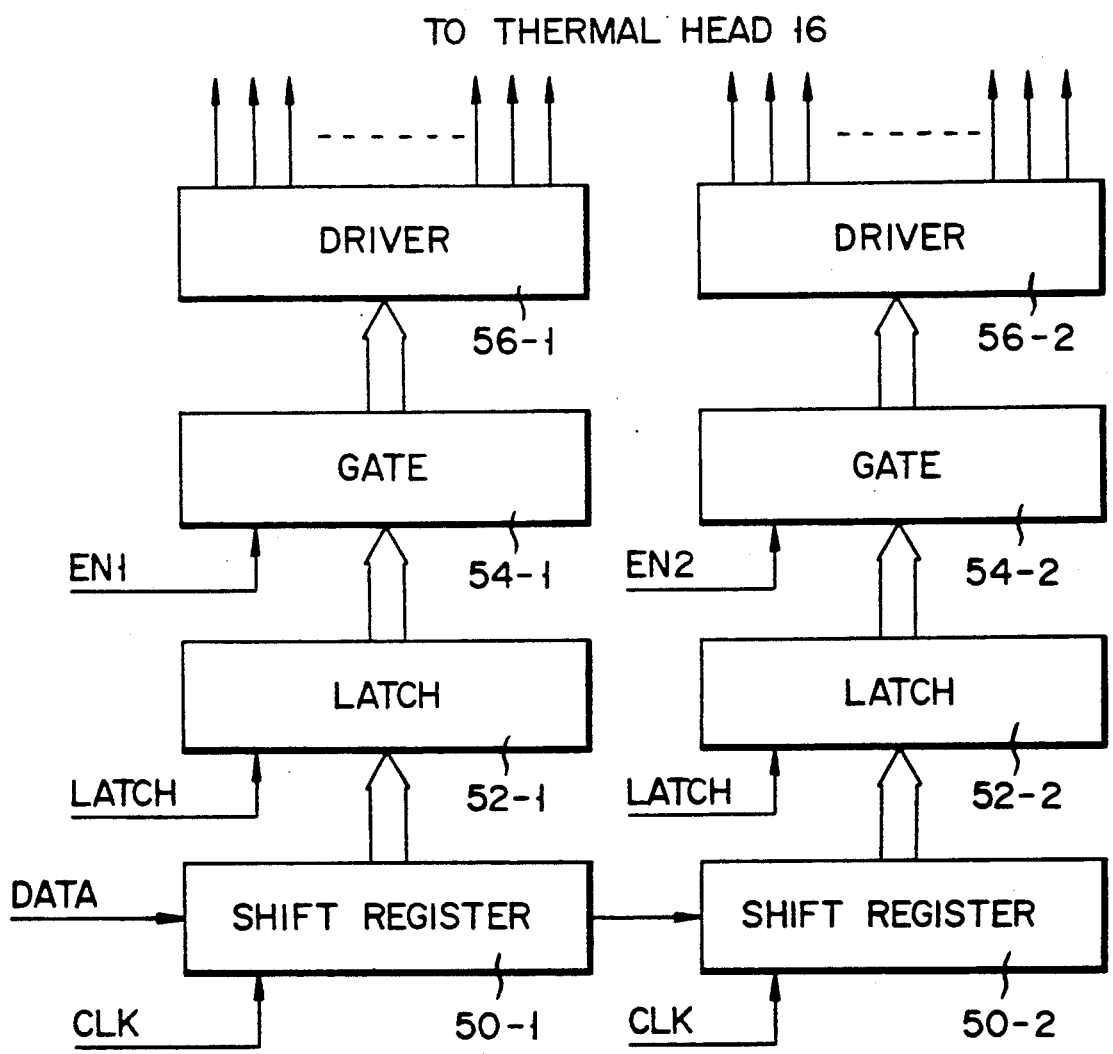
FIG. 9 is a block diagram showing a thermal head driver shown in FIG. 1.

FIG. 9 is a detailed block diagram of the driver 14 shown in FIG. 1. It should be noted that a thermal head 16 is driven by two phases, and has two identical circuits with suffix numbers 1 and 2. The data supplied from the generator 12 is supplied to a shift register 50-1, and the output from the register 50-1 is transferred to a shift register 50-2. The same clock signal is supplied to the registers 50-1 and 50-2. The outputs from the registers 50-1 and 50-2 are supplied to latches 52-1 and 52-2 in parallel. The latches 52-1 and 52-2 receive a common latch signal. The outputs from the latches 52-1 and 52-2 are supplied to gates 54-1 and 54-2, respectively. The gates 54-1 and 54-2 receive enable signals EN1 and EN2, respectively. The outputs from the gates 54-1 and 54-2 are supplied to the heating members in respective phases of the thermal head through drivers 56-1 and 56-2.

FIGS. 10A to 10G are timing charts showing the operation of this circuit. When 2,560 bit data is serially transferred six times within 2 msec, the transfer rate is about 8 Mbits/sec. On the other hand, a thermal head drive IC normally has a transfer rate of about 4 Mbits/sec. Therefore, parallel data input ports must be provided to the thermal head for high speed data transfer. In this embodiment, the thermal head has eight inputs. Therefore, data transfer of 2,560/8=320 bits is performed.

Figure 11:
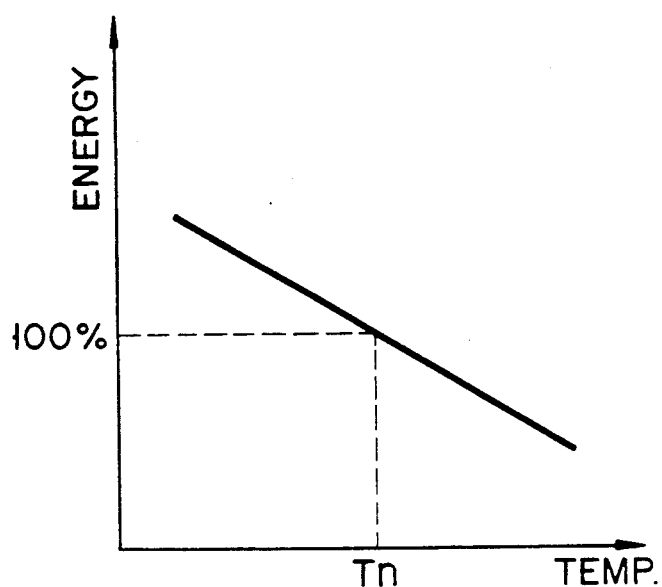
FIG. 11 is a graph showing the relationship between energy supplied to a thermal head and a temperature thereof.
Figure 12:
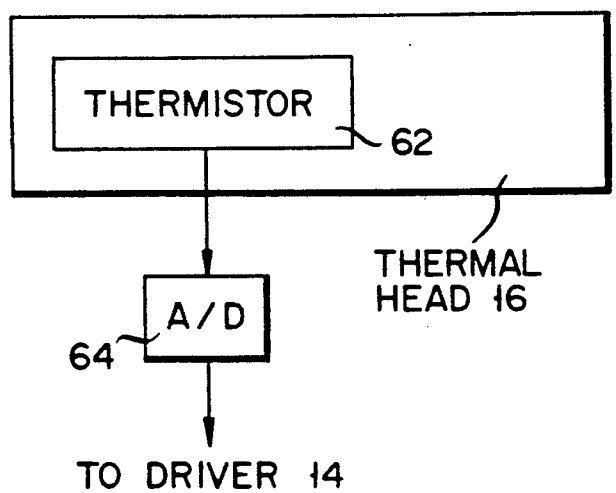
FIG. 12 is a block diagram showing a thermal head shown in detail in FIG. 1.

In this embodiment, as shown in FIG. 1, heat from the thermal head 16 is detected, and the detection data is fed back to the driver circuit 14. Since an ink amount differs depending upon the temperature of the head 16, even at the same energy level, the energy level must be controlled by heat from the head 16. For this reason, assuming that, as shown in FIG. 11, the energy level at a normal temperature (Tn) is 100%, the energy level is decreased as temperature increases. Therefore, even if the temperature is changed, a constant amount of ink can be transferred. In this embodiment, as shown in FIG. 12, the head 16 is connected to a thermistor 62, and the output therefrom is supplied to the driver 14 through an A/D converter 64.

The driver 14 exerts control, in accordance with the detected temperature value, in the following manner. As shown in FIGS. 9 and 10, energy supplied to the head 16 is controlled by the gates 54-1 and 54-2. For this reason, pulse widths of the enable signals EN1 and EN2 shown in FIGS. 13A and 13B and supplied to the gates 54-1 and 54-2, are decreased as shown in FIGS. 14A and 14B, respectively, thus serving to reduce the energy requirements. Alternatively, as shown in FIGS. 15A and 15B, when amplitudes of the output voltages from the drivers 56-1 and 56-2 are decreased, this too can decrease the energy requirements.

Figure 16A:
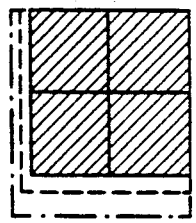
FIGS. 16A to 16C are views showing the effectiveness of a dot pattern used in a third embodiment.
Figure 16B:
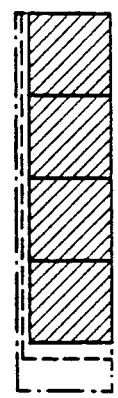
Figure 16C:
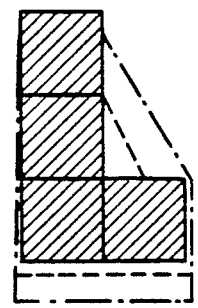

Another embodiment will be described in which selection of a dot pattern in each density range is altered. In a third embodiment, a dot pattern comprising a combination of L-shaped dot patterns is used in every density range. Effectiveness of the L-shaped pattern will be explained with reference to FIGS. 16A to 16C. FIG. 16A shows a concentrated pattern used in a DITHER method, FIG. 16B shows a stripe pattern, and FIG. 16C shows the L-shaped pattern according to the third embodiment. Each pattern has 4 dots. Broken lines and alternate long and short dashed lines respectively indicate the sizes of pixels formed when these patterns are energized so as to transfer an ink. Note that the alternate long and short dashed lines indicate cases having higher energy. In general, in high-speed thermal transfer printing, a pixel slightly expanded along the subscanning direction (the direction in which the printing paper moves; the vertical implied in the figure) is apt to be formed. Therefore, a pixel is expanded in accordance with the number of dots along the subscanning direction. In other words, if the same amount of energy is supplied, the dynamic range of gradation is widened. In addition, since a dot generally has a regular rectangular shape and is of a small matrix size, e.g., the concentrated pattern shown in FIG. 16A, a bridge is formed between two adjacent dots when the energy level is increased, resulting in degradation in smoothness due to uneven density, and in image quality due to noise caused by the random generation of bridges. In contrast, in the L-shaped pattern shown in FIG. 16C, since the pixel is expanded within a region surrounded by dot arrays along the main scanning and subscanning directions, a wider dynamic range of gradation can be obtained as compared to the patterns shown in FIGS. 16A and 16B. This result is more notable in a pattern comprising a combination of L-shaped patterns than in a single L-shaped pattern.

Figure 17A:
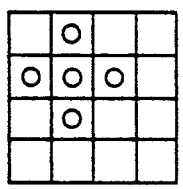
FIGS. 17A to 17F are views showing a dot pattern used in the third embodiment and the shape of a pixel formed thereby.
Figure 17C:
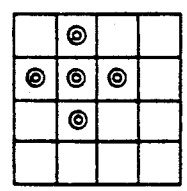
Figure 17E:
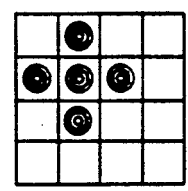
Figure 17B:
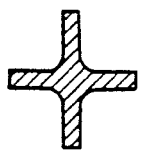
Figure 17D:
Figure 17F:

FIGS. 17A to 17F show the sizes of pixels when cross-shaped patterns, as a combination of L-shaped patterns arranged in a 4×4 dot matrix, and high, medium and low levels of energy are supplied to dots. FIG. 17A shows a case wherein low level energy is supplied to the dots, and FIG. 17B shows the resultant size of a pixel. FIG. 17C shows a case wherein medium level energy is supplied to the dots, and FIG. 17D shows the resultant size of a pixel. FIG. 17E shows a case wherein high level energy is supplied to the dots, and FIG. 17F shows the resultant size of a pixel. In this manner, since the cross-shaped pattern includes four regions surrounded by dot arrays along the main and subscanning directions, the dynamic range of gradation can be widened.

Figure 18A:
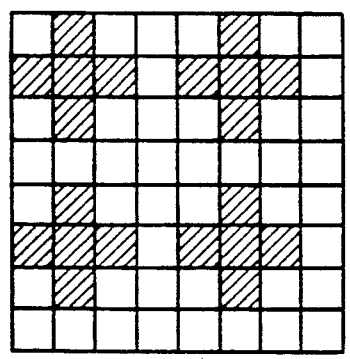
FIGS. 18A and 18B are views showing a pattern and the shape of continuous pixels when a plurality of dot patterns used in the third embodiment are continuously arranged.
Figure 18B:
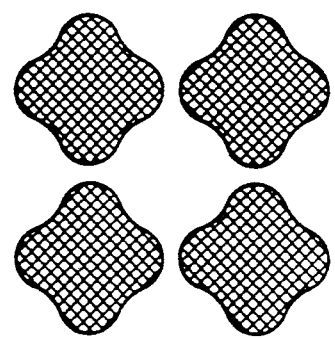

In the third embodiment, it is considered that adjacent patterns should have less, and preferably no dots contacting each other when each pattern is selected. When there are no dots contacting each other between two adjacent patterns, the following effect can be obtained. As shown in FIG. 18A, cross-shaped patterns having five dots are arranged in four adjacent 4×4 dot matrices. These patterns have not dots contacting each other. FIG. 18B shows a case wherein an ink is transferred using these patterns. Since the patterns are spaced apart from each other, even if the energy level is changed, the respective patterns are kept separate. As the energy level is increased, the pixels are enlarged. However, since non-energized dots are present between adjacent patterns, attachment of an ink and ink transfer to the printing paper are unlikely to occur at such non-energized dots when peeling of the ink ribbon from the printing paper. Thus, independency of the patterns can be maintained. In this case, since the narrowest portions of the cross-shaped patterns are adjacent to each other, they serve to maintain the independency of the patterns. Even if the respective patterns contact each other, when the narrowest portions of the patterns contact each other, the center of the cross-shaped pattern is furthest from the contacting portion. Thus, pixels are expanded from the center of the dot matrix in accordance with the energy level, and non-transferred ink portions are concentrically contracted. Thus, if the energy level is increased, a satisfactory image quality can be maintained. In general, when adjacent patterns contact each other, an increase in the ink transfer area is observed in the contacting portion in accordance with pixel forming energy, this increase occurring abruptly. For this reason, linearity of gradation in accordance with an increase in pixel forming energy is often impaired.

Figure 19A:
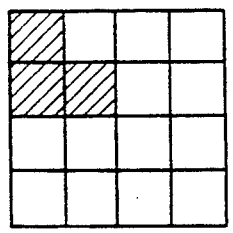
FIGS. 19A to 19N are views showing examples of dot patterns used in the third embodiment.
Figure 19B:
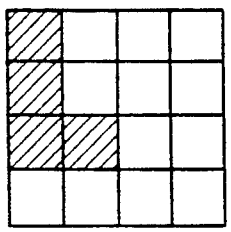
Figure 19C:
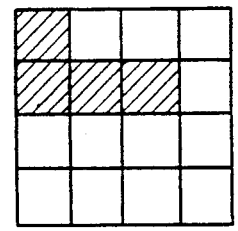
Figure 19D:
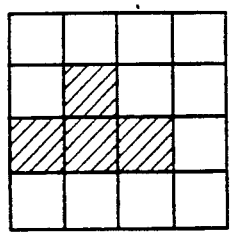
Figure 19E:
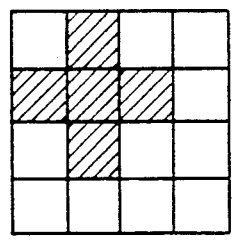
Figure 19F:
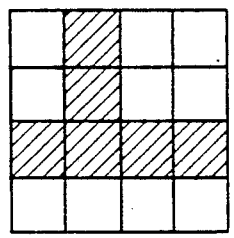
Figure 19G:
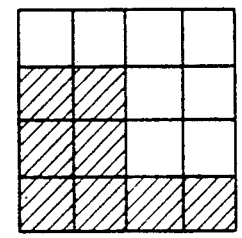
Figure 19H:
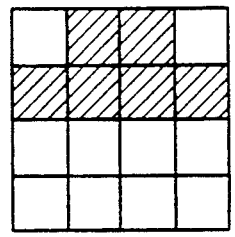
Figure 19I:
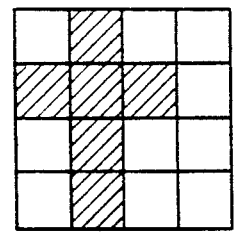
Figure 19J:
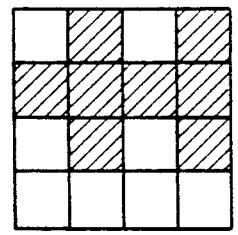
Figure 19K:
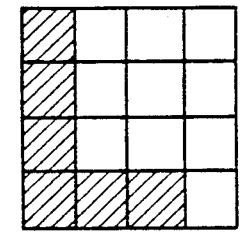
Figure 19L:
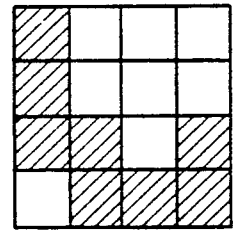
Figure 19M:
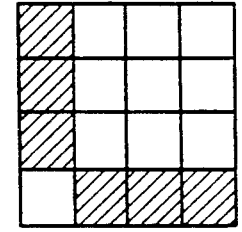
Figure 19N:
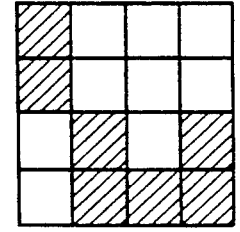
Figure 20:
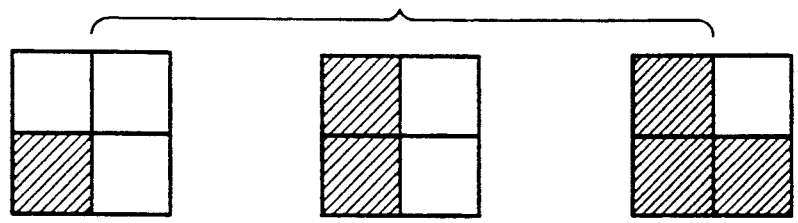
FIG. 20 is a view showing a dot pattern of the third embodiment when a pixel has a 2×2 matrix size.

FIGS. 19A to 19N show examples of dot patterns used in the third embodiment in the order from lower gradation levels to higher gradation levels. Note that although each pattern has 4×4 dots, it needs to have 2×2 dots or more. However, in order to print a halftone image at high resolution, m and n of an m×n matrix size satisfy, preferably $2 \leq m \leq n \leq 6$. FIG. 20 shows patterns when m=n=2.

Figure 21:
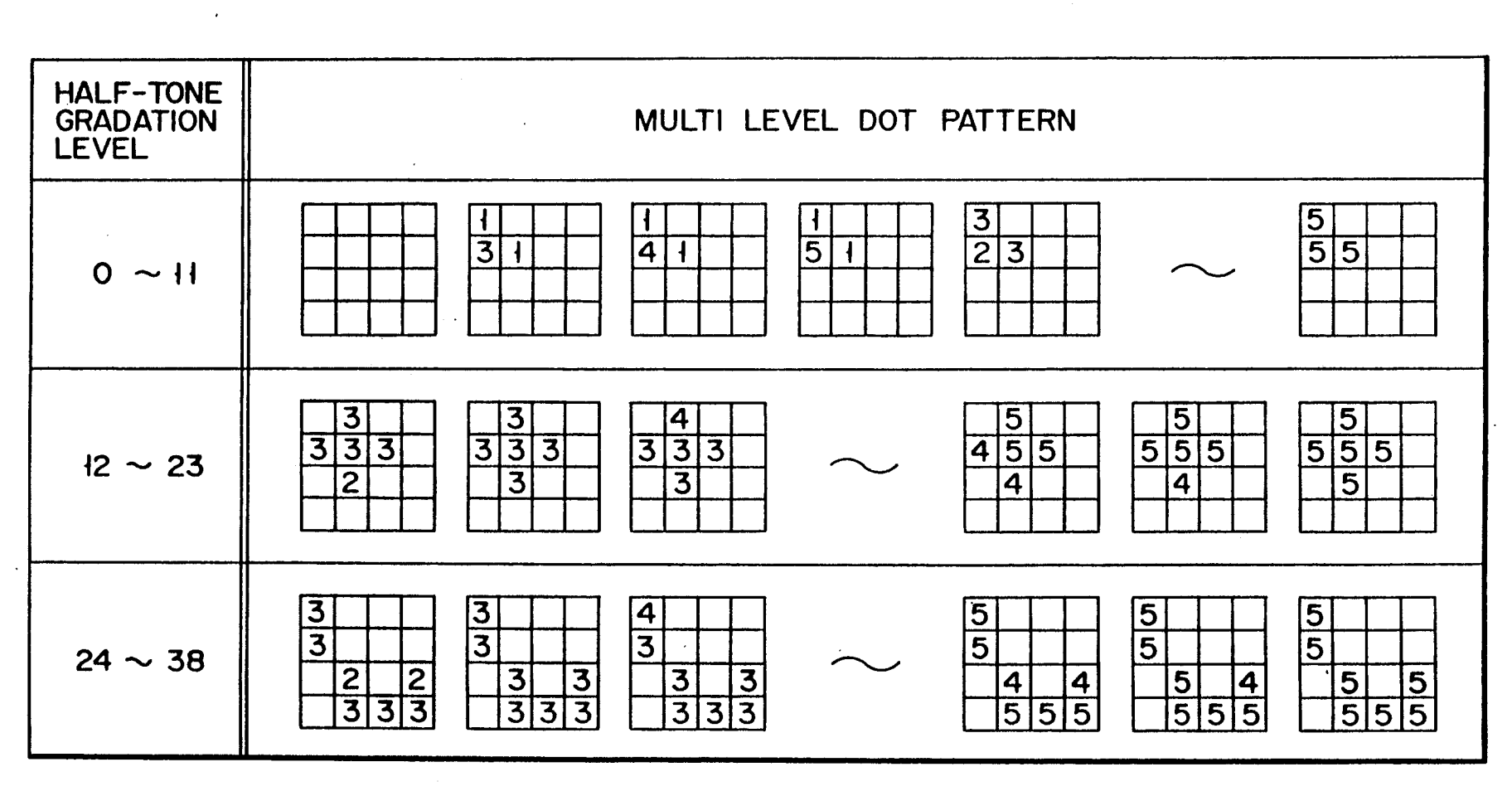

FIG. 21 shows halftone gradation levels of the third embodiment and energy supply levels for dots of dot patterns. In this case, the L-shaped pattern shown in FIG. 19A is assigned to the low density range, the cross-shaped pattern shown in FIG. 19E is assigned to the middle density range and the combined L-shaped pattern shown in FIG. 19L is assigned to the high density range, thereby providing 39 levels.

Figure 22:
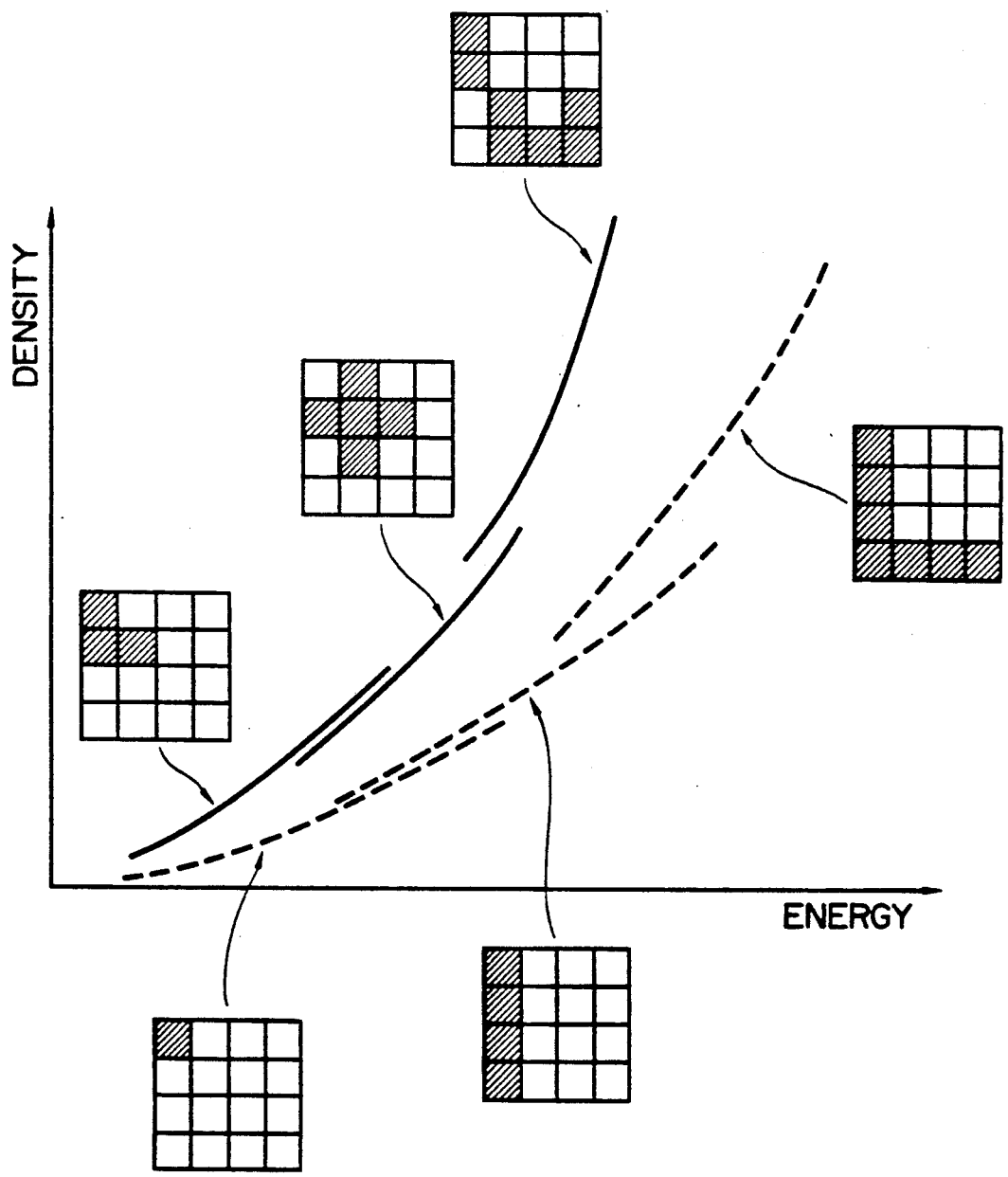
FIG. 22 is a graph showing the relationship between energy supplied and an optical density of a pixel formed when the printing head is driven using the multilevel dot pattern of the third embodiment.
Figure 23A:
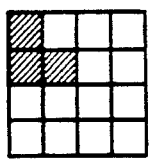
FIGS. 23A to 23D are views showing dot patterns compared to indicate the effectiveness of a fourth embodiment.
Figure 23B:
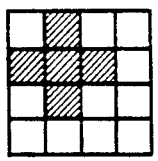
Figure 24A:
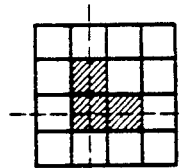
FIGS. 24A to 24D are views showing multilevel dot patterns, in respective density ranges, used for driving a printing head in the fourth embodiment.
Figure 24B:
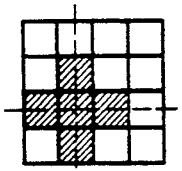
Figure 23C:
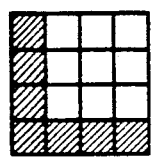
Figure 23D:
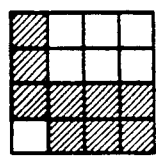
Figure 24C:
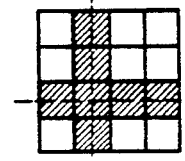
Figure 24D:
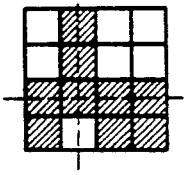

FIG. 22 is a graph for comparing the density characteristics of the multilevel pixels printed in the third embodiment and another previous embodiment (second embodiment). The characteristics of the third embodiment are indicated by the solid curve, and those of the other embodiment are indicated by the broken curve. In the third embodiment, as can be seen from this graph, the dynamic range of gradation can be widened, and a change in density can be obtained with good linearity. In addition, good image quality with no density irregularity can be obtained in the overall density range.

A fourth embodiment will be described hereinafter. In the fourth embodiment, dot patterns in each dot range are selected so that positions of the dot arrays forming each dot pattern are the same (or in the same phase). That is, the pattern is determined so that the dot array forming the pattern is located at the same position in at least one of the main and subscanning directions. This is because pixels can be stably formed since the heat pile-up of the dot can be effectively utilized, and, in each pattern, the dynamic range of gradation is wide and linearity is high.

Figure 25A:
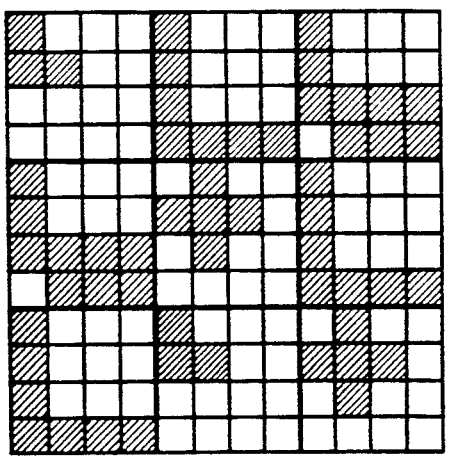
FIGS. 25A and 25B are views showing a pattern when a plurality of dot patterns are continuously arranged in comparison with a conventional dot pattern.
Figure 25B:
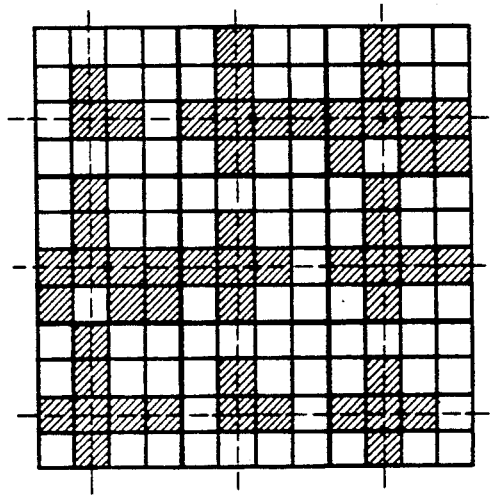
Figure 26A:
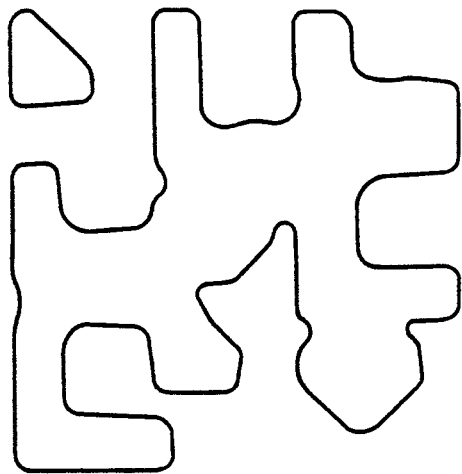
FIGS. 26A and 26B are views showing the shape of a pixel formed when the thermal head is driven using the patterns shown in FIGS. 25A and 25B.
Figure 26B:
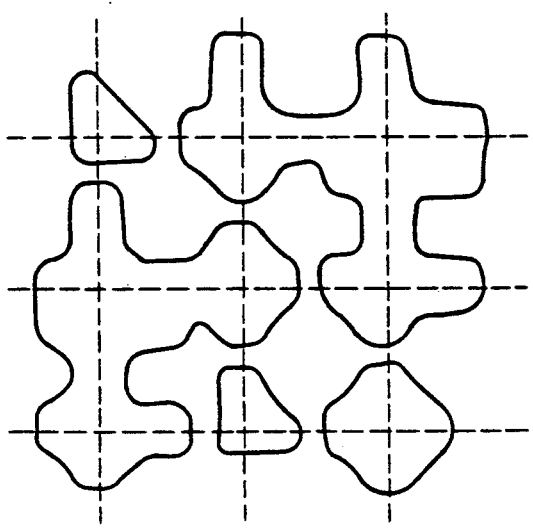
Figure 27A:
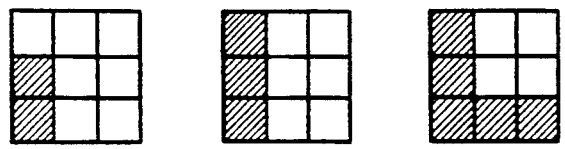
FIGS. 27A to 27D are views showing another example of multilevel dot patterns, in respective density ranges, used for driving the printing head in the fourth embodiment.
Figure 27B:
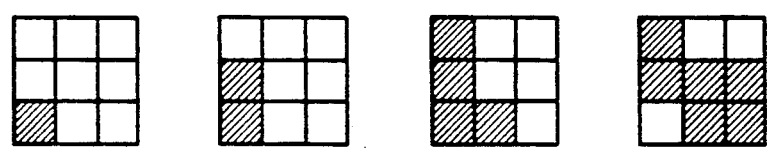
Figure 27C:
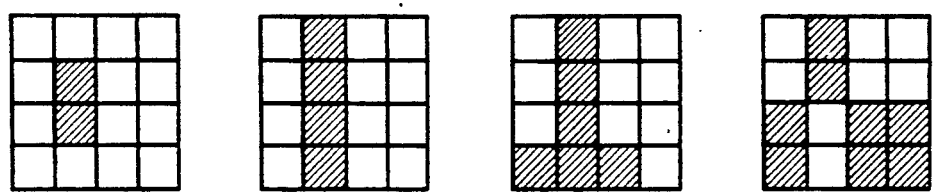
Figure 27D:
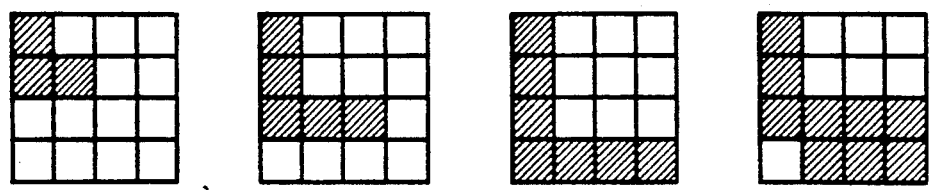
Figure 28A:
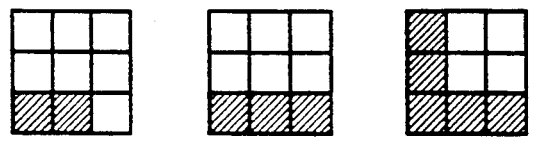
FIGS. 28A to 28D are views showing still another example of multilevel dot patterns, in respective density ranges, used for driving the printing head in the fourth embodiment.
Figure 28B:
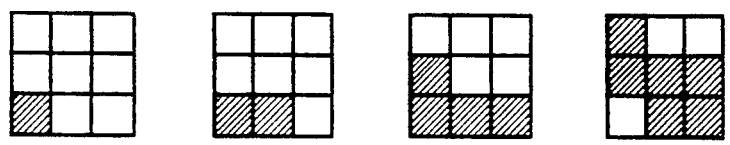
Figure 28C:
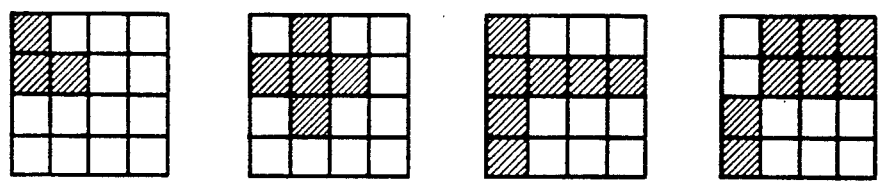
Figure 28D:
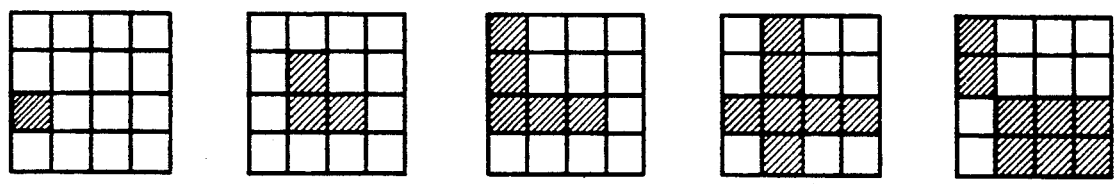
Figure 29A:
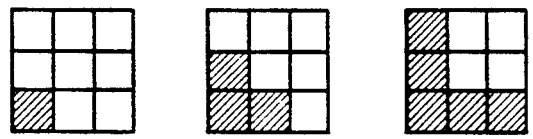
FIGS. 29A to 29B are views showing still another example of multilevel dot patterns, in respective density ranges, used for driving the printing head in the fourth embodiment.
Figure 29B:
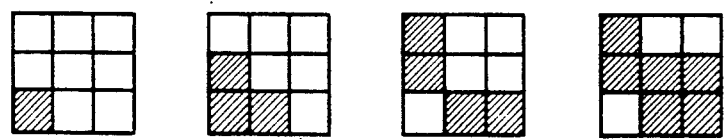
Figure 29C:
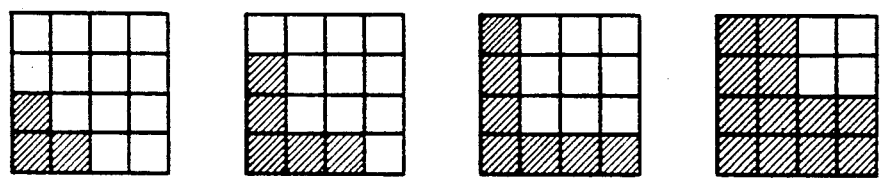
Figure 29D:
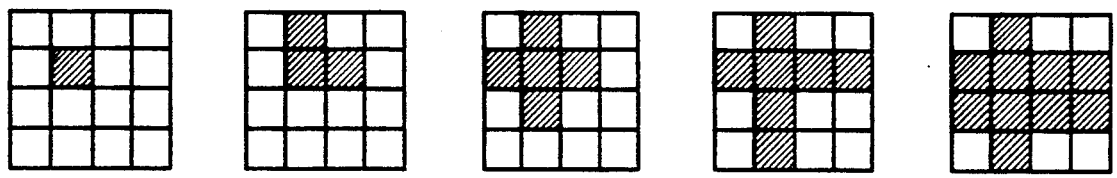

The patterns of the fourth embodiment will be described with reference to FIGS. 23A to 23D, and FIGS. 24A to 24D for the purpose of comparison with conventional patterns. FIGS. 23A to 23D, show the conventional patterns, and, FIGS. 24A to 24D show the dot patterns of the fourth embodiment. In this case, the overall density range is divided into four ranges. FIG. 25A is a view showing a dot pattern in which the conventional patterns shown in FIGS. 23A to 23D are continuously formed. FIG. 25B is a view showing a dot pattern in which the dot patterns of the fourth embodiment shown in FIGS. 24A to 24D are continuously formed. As shown in FIGS. 23A to 23D, when positions of the crossing points of the dot arrays in the patterns are different from each other, and when different patterns are formed adjacent to each other as shown in FIG. 25A, each dot may either make contact with the adjacent dot array, or be greatly separated therefrom. Therefore, the printing state becomes that as shown in FIG. 26A. In this state, printed and blank portions are aligned irregularly, and image quality is degraded by unstable gradation production caused by noise due to uneven density or a bridge irregularly generated between dot arrays of adjacent pixels. In contrast to this, according to the fourth embodiment, as indicated by broken lines in FIGS. 24A to 24D, since the phases of dot arrays in all the patterns coincide with each other in the main scanning and subscanning directions, heating centers also coincide with each other. As shown in FIG. 25B, even when different patterns are formed adjacent to each other, all the dot arrays can be regularly aligned. For this reason, since the printed and blank portions are aligned regularly in the printed state shown in FIG. 26B, image quality will not be degraded by unstable gradation reproduction caused by noise due to uneven density or a bridge irregularly generated between dot arrays of adjacent pixels. Therefore, the gradation reproduction characteristics can be greatly improved. When pixels are regularly aligned in a matrix form on the overall printing screen and the gradation reproduction characteristics are good even in a portion in which different patterns are formed adjacent to each other, high image quality printing can be achieved with less noise as compared to a conventional method.

FIGS. 27A to 27D, FIGS. 28A to 28D and FIGS. 29A to 29D show various examples of the dot pattern of the fourth embodiment. These figures show combinations of patterns in the respective density ranges. In FIGS. 27A to 27D, positions of dot arrays coincide with each other along the main scanning direction (lateral direction in figures). In FIGS. 28A to 28D, positions of the dot arrays coincide with each other along the subscanning direction (vertical direction in figures). In FIGS. 29A to 29D, the positions of the dot arrays coincide along both the main scanning and subscanning directions.

In the case of a discrete dot pattern constituting a single dot, although a dot position can be arbitrary, if such a discrete dot is regarded as a dot array and is aligned along an extending line of a dot array in another pattern, a better effect is obtained.

Figure 30:
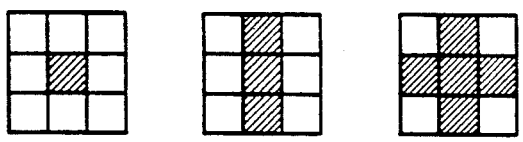
FIG. 30 is a view showing multilevel dot patterns used for driving a printing head in a fifth embodiment.
Figure 31:
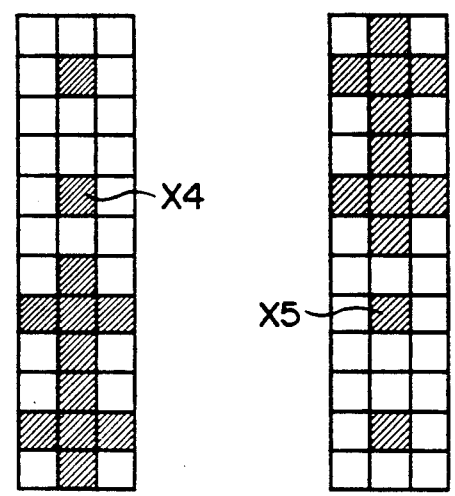
FIG. 31 is a view showing the shape of a pixel formed by driving the thermal head using the dot patterns shown in FIG. 30.
Figure 32:
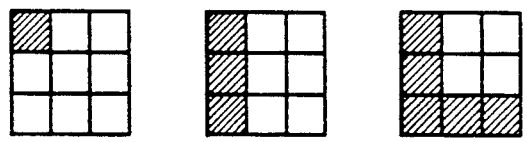
FIG. 32 is a view showing multilevel dot patterns compared to indicate the effectiveness of the fifth embodiment.
Figure 33:
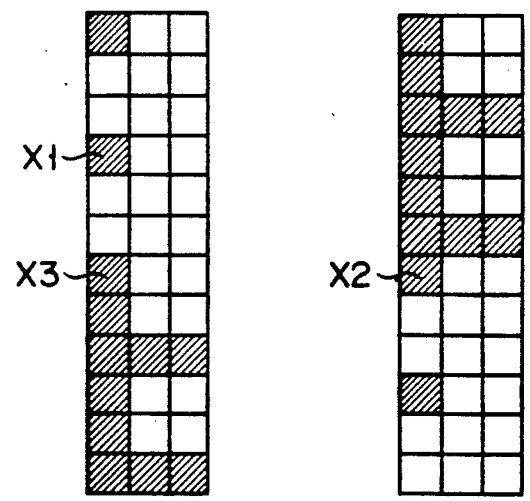
FIG. 33 is a view showing the shape of a pixel formed by driving the thermal head using the dot patterns shown in FIG. 32.

A fifth embodiment will be described hereinafter. In the fifth embodiment, as shown in FIG. 30, the heating center of each pixel coincides with the center of a dot matrix, and the dot pattern is established so as to be rotation symmetrical (of 180 degrees) about the center of the dot matrix. Each pixel has a 3×3 dot matrix configuration. A discrete dot pattern having only a central dot is assigned to the low density range, as shown at the left side of FIG. 30. A stripe dot pattern having 3 dots included in the center line is assigned to the middle density range, as shown in the central portion of FIG. 30. A cross-shaped dot pattern having 5 dots included in central vertical and lateral arrays is assigned to the high density range, as shown at the right of FIG. 30. With these patterns, as shown in FIG. 31, when the gradation patterns are switched from a high to a low level or vice versa, the dot pattern nearest the switched pattern remains the same. In contrast, in the case of the use of the non-symmetrical pattern of rotation shown in FIG. 32, when the gradation patterns are switched from a high to a low level or vice versa, the dot pattern nearest the switched pattern changes, as shown in FIG. 33. In the case of FIG. 33, the dot X2 does not have the cooling interval of a blank dot; consequently the dot X2 is printed as a large dot due to a heat pile up and has a size different from the dot X1 which has a cooling interval. Furthermore, since the dot X3 has a sufficient cooling interval, it is printed as a small dot. In the case of the figure to the left in FIG. 33, the density at a boundary becomes lower than a predetermined density, and, in the case of the figure to the right, the density at a boundary becomes higher than the predetermined density, i.e., exhibits a kind of edge emphasis characteristic resulting in discontinuity in the density. In contrast to this, in the case of FIG. 31, since dots X4 and X5 have the cooling interval of blank dots, they can be printed as dots having substantially the same size.

Figure 34:
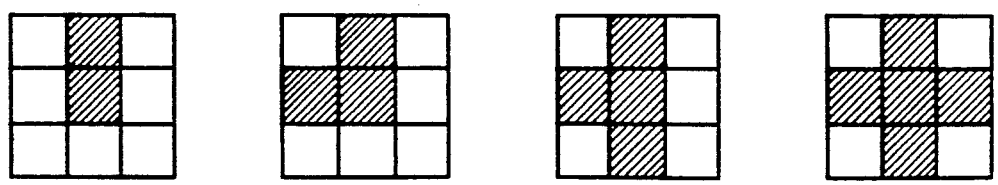
FIG. 34 is a view showing another example of multilevel dot patterns, in respective density ranges, used for driving the printing head in the fifth embodiment.
Figure 35:
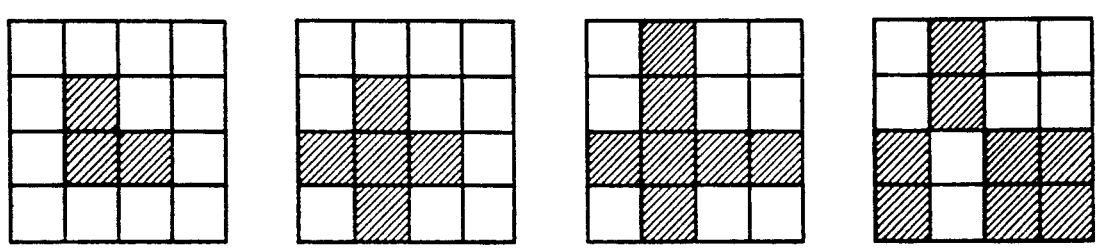
FIG. 35 is a view showing still another example of multilevel dot patterns, in respective density ranges, used for driving the printing head in the fifth embodiment.

FIGS. 34 and 35 are modifications of the dot patterns of the fifth embodiment.

Figure 36:
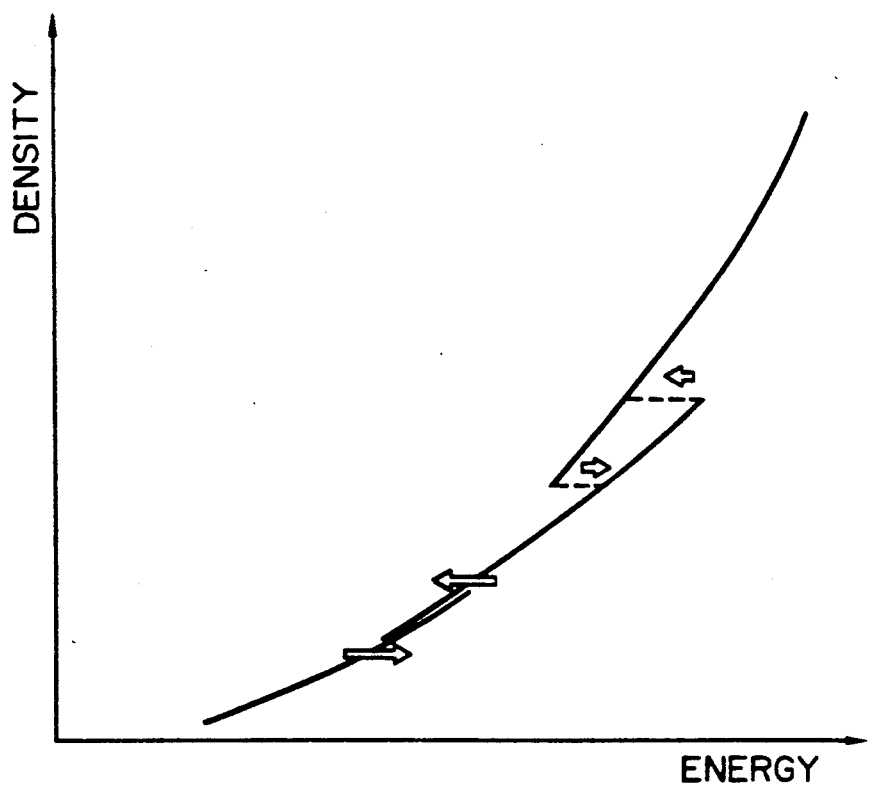
FIG. 36 is a graph showing characteristics of multilevel dot patterns, in respective density ranges, used for driving a printing head in a sixth embodiment.

A sixth embodiment will be described hereinafter. In this embodiment, as shown in FIG. 36, density ranges which are covered by respective dot patterns overlap, and the density level at which the dot patterns are switched are different in accordance with whether the density changes from a high to a low level or vice versa. In general, in the second to fifth embodiments, the dot patterns are selected in accordance with the density level and noise tends to be generated when the dot patterns are switched. For this reason, when the printing density is changed, the switching frequency of the dot patterns is preferably decreased as low as possible. In this embodiment, a changing direction of the density is detected, and when the density is changed from a high to a low level, a dot pattern which covers the high density range of the overlapping dot patterns is used. In contrast to this, when the density is changed from a low to a high level, a dot pattern which covers the low density range of the overlapping dot patterns is used. Thus, the switching frequency of the dot patterns can be reduced.

Figure 37:
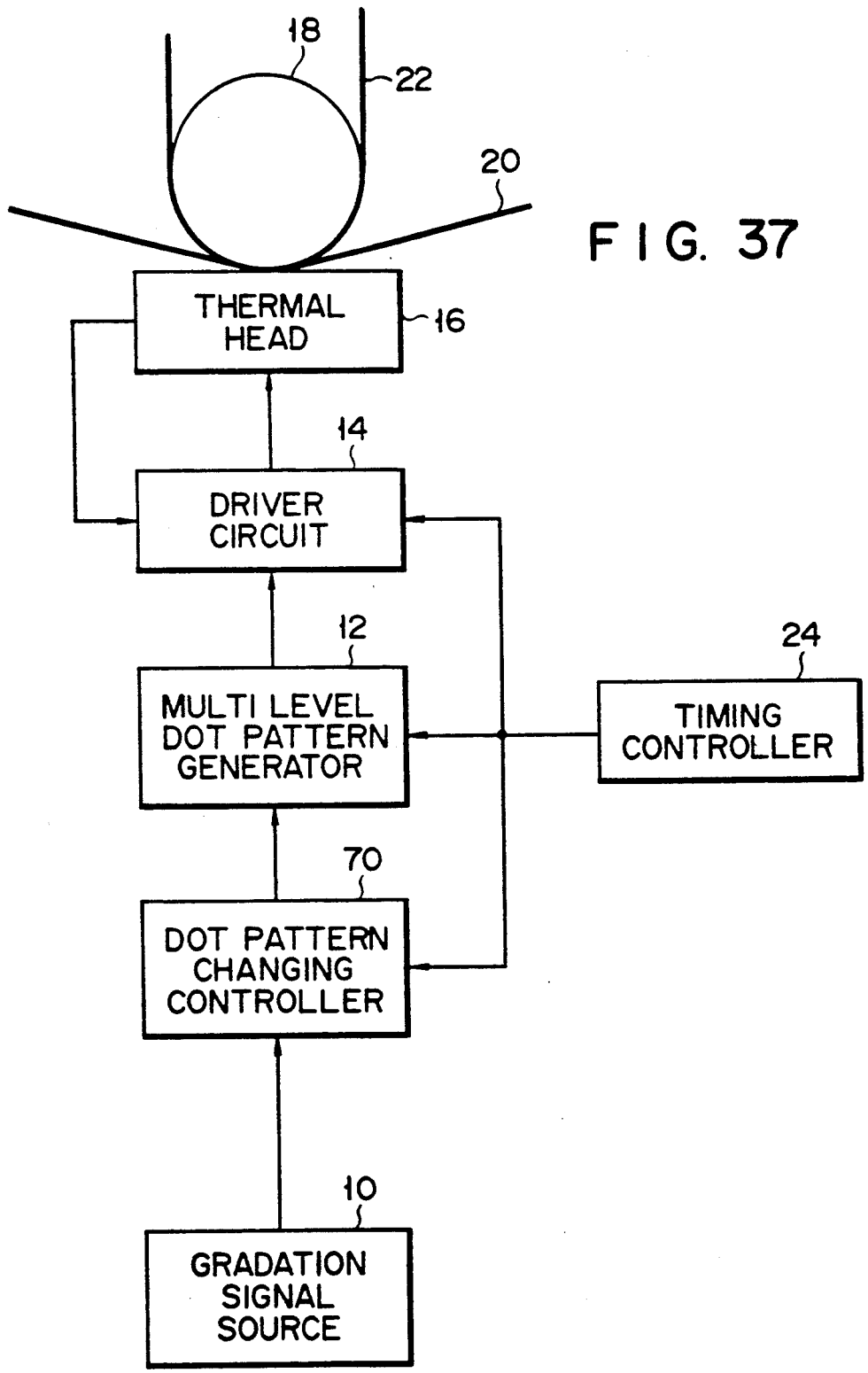
FIG. 37 is a block diagram showing an arrangement of the sixth embodiment.
Figure 38:
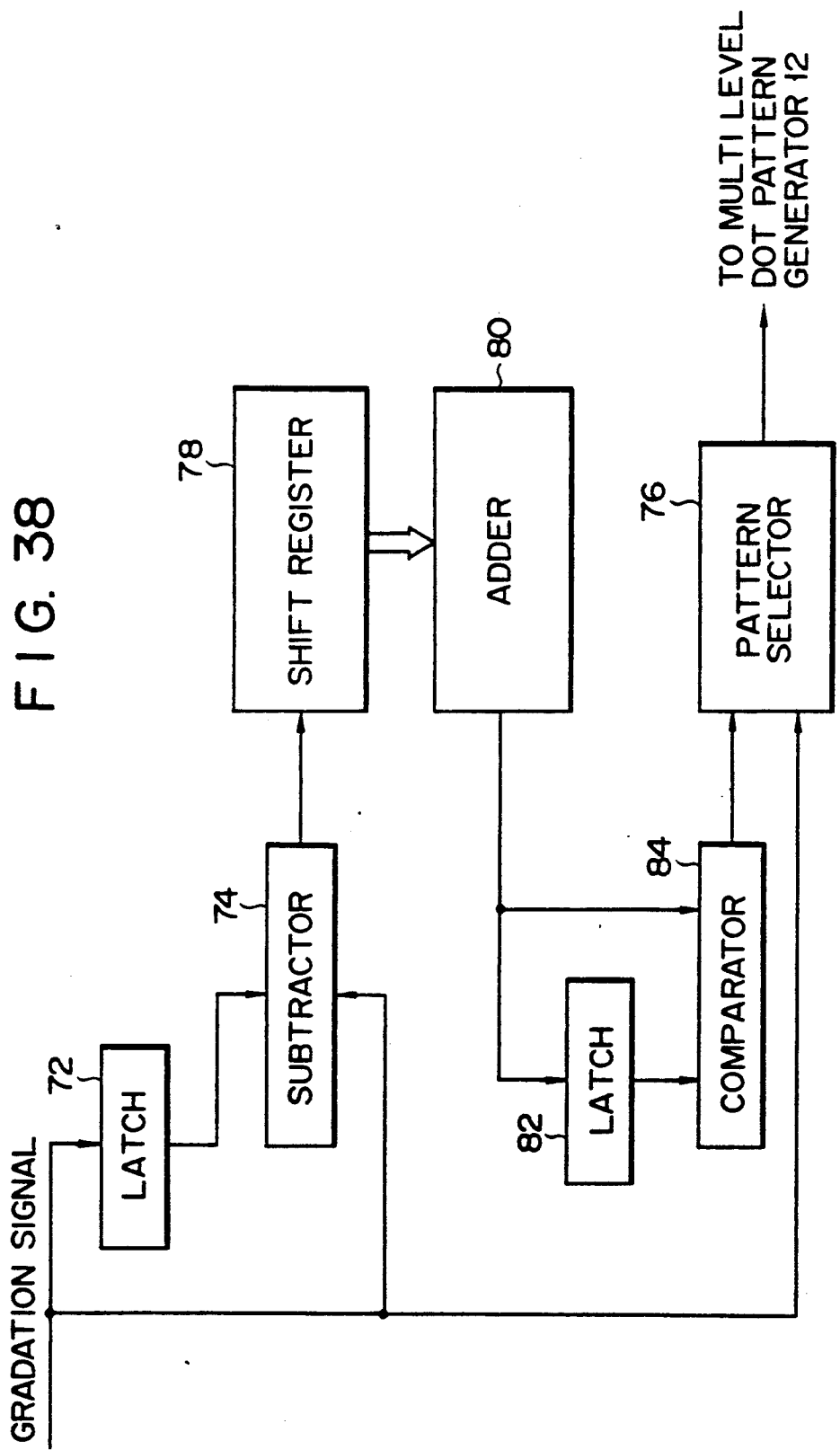
FIG. 38 is a block diagram showing a dot pattern changing controller of the sixth embodiment.
Figure 39:
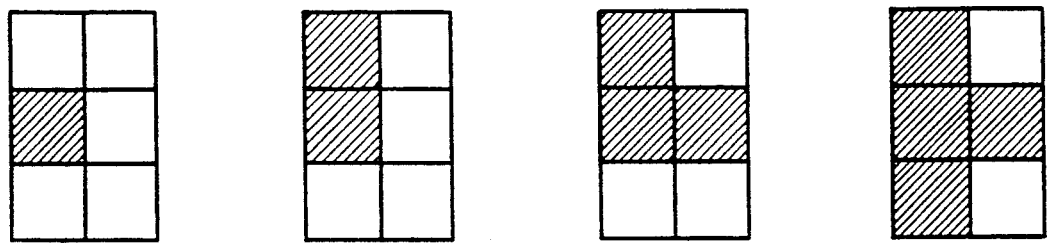
FIG. 39 is a view showing dot patterns when a pixel has a 2×3 dot matrix size.
Figure 40:
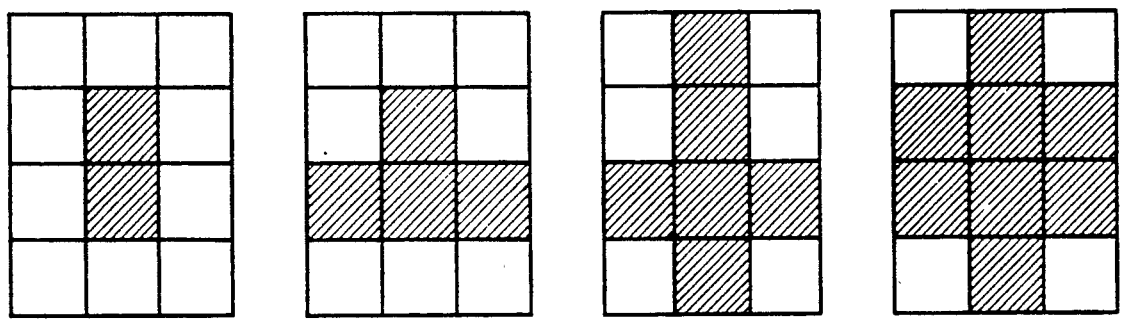
FIG. 40 is a view showing dot patterns when a pixel has a 3×4 dot matrix size.
Figure 41:
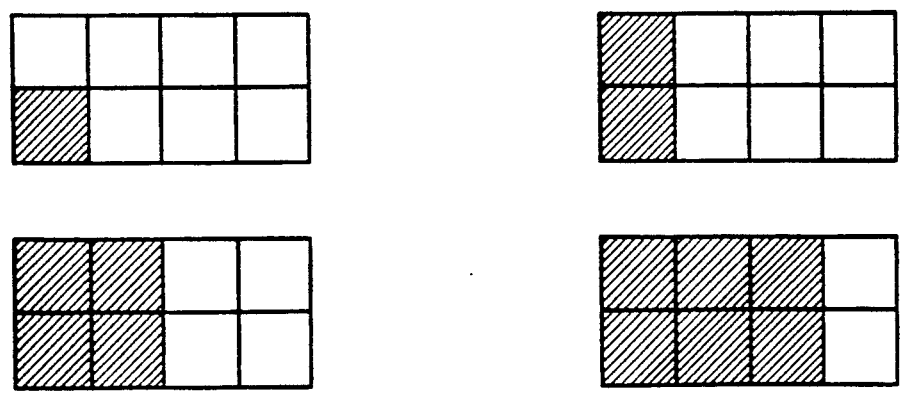
FIG. 41 is a view showing dot patterns when a pixel has a 4×2 dot matrix size.

FIG. 37 shows a block diagram of the sixth embodiment. This block diagram is substantially the same as that of FIG. 1 except that a dot pattern changing controller 70 is connected between the gradation signal source 10 and the multilevel dot pattern generator 12. FIG. 38 shows the controller 70 in more detail. The gradation signal from the signal source 10 is supplied to a latch 72 and to a first input terminal of a subtractor 74 and a pattern selector 76. The output from the latch 72 is supplied to a second input terminal of the subtractor 74. The subtractor 74 subtracts the output signal from the latch 72 from the signal from the signal source 10, and supplies the subtraction result to a shift register 78. The register 78 delays an input image signal for every pixel, and outputs from the respective stages are supplied to an adder 80. The output signal from the adder 80 is supplied to a latch 82, and is also supplied to a first input terminal of a comparator 84. The output from the latch 82 is supplied to a second input terminal of the comparator 84. The output from the comparator 84 is supplied to the pattern selector 76, and the output from the selector 76 is supplied to the generator 12.

With this circuit, a pixel signal delayed by one pixel by the latch 72 is subtracted from the signal from the signal source 10, and a change in density for each pixel can be detected. In order to detect a density change in the main scanning direction at equal intervals, an average value of a change in density between m pixels (m corresponds to the number of stages of the register 78) is obtained. The average value is stored in the latch 78 every m pixels, and a change in the average values is detected to be either positive or negative by the comparator 84. The output from the comparator 84 and the input gradation signal are supplied to the selector 76, and the selector 76 supplies a selection signal to the generator 12 so as to select a halftone dot pattern included in the characteristics of the low density side of two overlapping characteristics when the change in density is positive. When the change in density is negative, the selector 76 supplies a selection signal to the generator 12 so as to select a halftone dot pattern included in characteristics at the high density side.

Above embodiments frequently uses a dot pattern including dots successively arranged in the subscanning direction to actively use the effect of heat accumulation.

Therefore, the dots at the highest optical density in the picture element are present concentrated in the specific vertical scanning or column direction in the dot matrix. The dot at the highest optical density is referred to as an energy concentrated dot, and as usually located at the center of the dot pattern. Since the picture elements are, of course, also arrayed in the horizontal direction, the energy concentrated dots are arranged in both the horizontal and vertical directions, to provide a lattice like texture. This texture, particularly in the low optical density region, may appear as a texture noise in the image.

The embodiment reducing the texture noise will be described.

Figure 42:
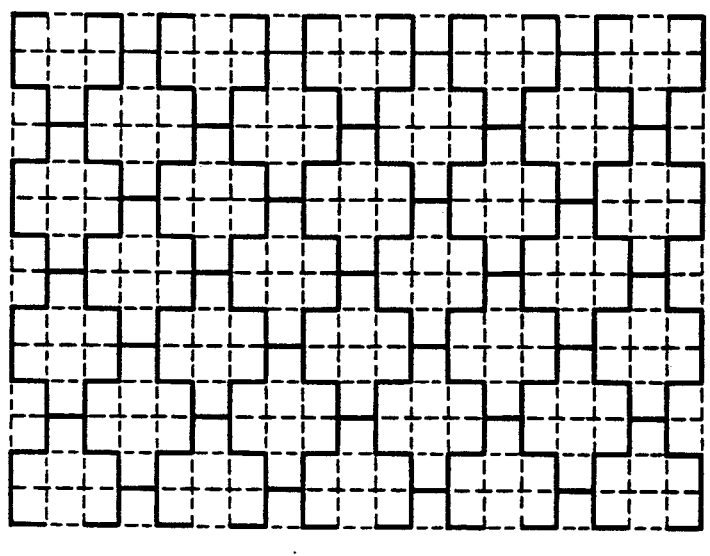
FIG. 42 shows a view illustrating an array of picture elements, which is used in a seventh embodiment of a halftone image printing device according to this invention.

In a seventh embodiment, an image consists of picture elements each made up of a dot matrix, which are arrayed in a zig-zag pattern, as shown in FIG. 42. As shown, each picture element row is out of line by one-half a picture element with the adjacent element row. Each picture element is composed of a 2 (column)×3 (row) rectangular matrix, one dot each added to the top and bottom of the rectangle, to make an 8-dot dot matrix. In this specification, this dot matrix is defined as a quasi-diamond-shaped dot matrix of $2\sqrt{2}\times2\sqrt{2}=8$. In printing picture elements, only the specific dots in this 8-dot matrix will be black, and the remaining dots will be white. In this specification, the term "dot pattern" will refer to this black dot pattern.

Figure 43:
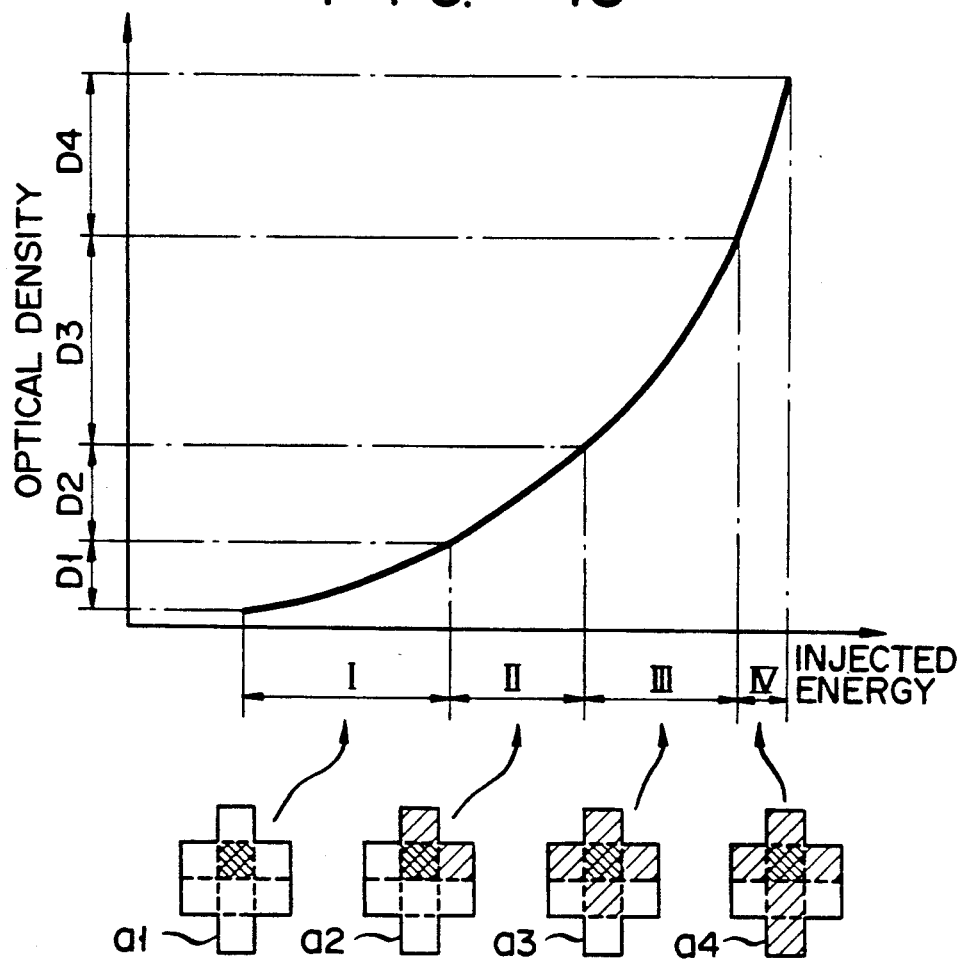
FIG. 43 shows a graph illustrating the relationship between dot patterns and an optical density.

In this embodiment, the optical density range represented by the ordinate in the graph of FIG. 43 is divided into four small density regions D1 through D4. The injected energy represented by the abscissa is segmented into four sections I to IV. Dot patterns a1 to a4 are assigned to these sections I to IV, as shown in FIG. 43. Specifically, the abscissa or horizontal axis represents a total amount of energy to be injected into the heat resistors of a thermal head included in the one picture element for forming one picture element. The ordinate or vertical axis represents an optical density of one picture element. The printing energy of each dot in each dot pattern is controlled in multilevel according to the optical density. The multilevel dot pattern is used for printing one picture element. The size of the printing dot varies in proportion to the amount of injected energy. Therefore, in order to allow room for larger dots, the space between the heating dots is set broadly. When the dot pattern is applied to thermal transfer printing, an amount of injected energy is determined by the drive pulse width, the drive pulse amplitude (voltage), or a combination of both, of the thermal head.

In FIG. 43, a1 is a dot pattern containing one printing dot located at the upper central part of the rectangular matrix. Pattern a2 uses one additional dot at the top of the printing dot in pattern a1, and one to the right, to form an "L" shaped pattern. Pattern a3 forms a cross by using four dots at the top, bottom, right, and left of the recording dot in pattern a1. Pattern a4 uses one additional dot at the bottom of pattern a3. Of the dots shown in these patterns a1 through a4, the energy concentrated dot with the highest density (indicated by slanted lines in both directions) is the dot included in pattern a1. It is noted that even though the dot pattern changes, the position of this energy-concentrated dot is constant, and does not change. This is one of the features of the invention in this application.

An example of the expression of 36 gradation levels by using these 4 types of multilevel patterns is shown in FIG. 44. In the first density region (gradation levels 0 to 6), the injected energy of the one printing dot of pattern a1 is varied from 0 to 6. In the second density region D2 (gradation levels 7 to 15), the total injected energy of the three printing dots of pattern a2 is varied from 7 to 15. In the third density region D3 (gradation levels 16 to 30), the total injected energy of the 5 printing dots of pattern a3 is varied from 16 to 30. In the fourth density region D4 (gradation levels 31 to 36), the total injected energy of the six printing dots of pattern a4 is varied from 31 to 36.

In the above manner, a density gradation of 36 step can be obtained by the picture elements each made up of a quasi-diamond-shaped dot matrix of $2\sqrt{2}\times2\sqrt{2}$ (=8) dots.

Figure 45A:
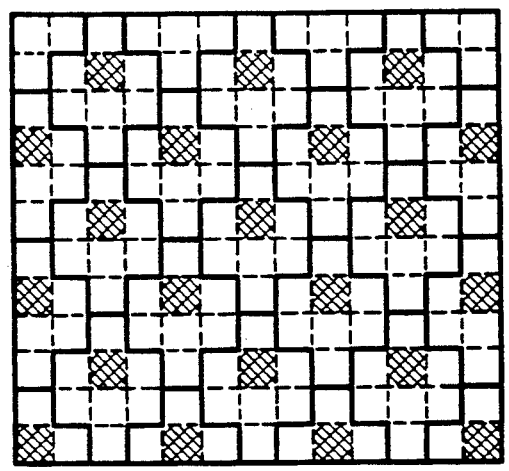
FIGS. 45A through 45C show matrix patterns formed when different dot patterns are successively printed.

FIG. 45A shows a dot matrix formed when dot pattern a1 is successively printed. Since the picture element is not rectangular, but quasi-diamond-shaped, each picture element row is out of line with the adjacent row by one-half picture element. Therefore, the energy-concentrated dots, as indicated by crossed oblique lines (in this case the dot pattern contains a single dot), are located at different vertical positions in the adjacent two rows of the picture element matrix. The energy-concentrated dots are arrayed not in both the horizontal and vertical directions, but arrayed in the diagonal directions. As a result, a lattice like texture noise is never generated, and no unpleasant sensation is imparted to the human eye.

Figure 45B:
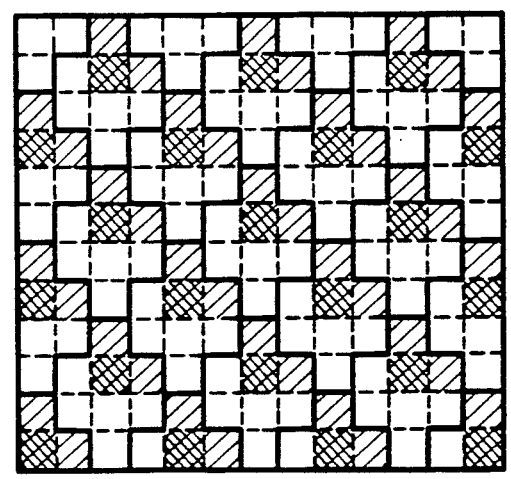

FIG. 45B shows a dot matrix formed when dot patterns a2 are successively printed. As seen from this matrix pattern, the printing dots as shaded by lines slanted down from the right to left in the dot, are aligned in the diagonal directions. The printing dots are aligned vertically at some points, but the energy-concentrated dots are arrayed staggered, as in the case of FIG. 45A. The unpleasant sensation to the human eyes is lessened.

Figure 45C:
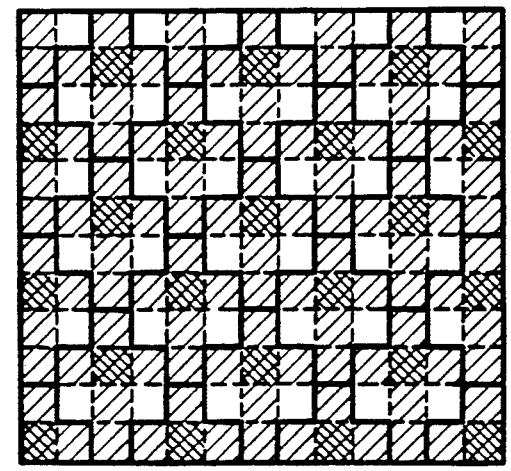

FIG. 45C shows a dot matrix as it appears when dot patterns a4 are successively recorded. The printing dots are continuously aligned in both the horizontal and vertical directions, to form a lattice-like configuration. However, the energy concentrated dots are arrayed staggered, as in the case of FIG. 45A, and blank spaces are arrayed in a uniform pattern. Therefore, the unpleasant visual sensation problem is solved. The dot patterns a4 of adjacent picture elements are interconnected with the connecting parts formed, so that dot pattern a4 is equivalent to a dot pattern which consists of 3 dots of those of a 2×2 square dot matrix. Even though the picture element is a quasi-diamond-shaped dot matrix of $2\sqrt{2}\times2\sqrt{2}$, it has the size of the 2×2 matrix in the high density region, to apparently improve the resolution. In this density region, the printing dots are successively arrayed and form a lattice pattern. However, this is not problematic, because according to the visibility characteristic of the human eye, a distinguishable gradation level is low in the high density region.

Figure 46:
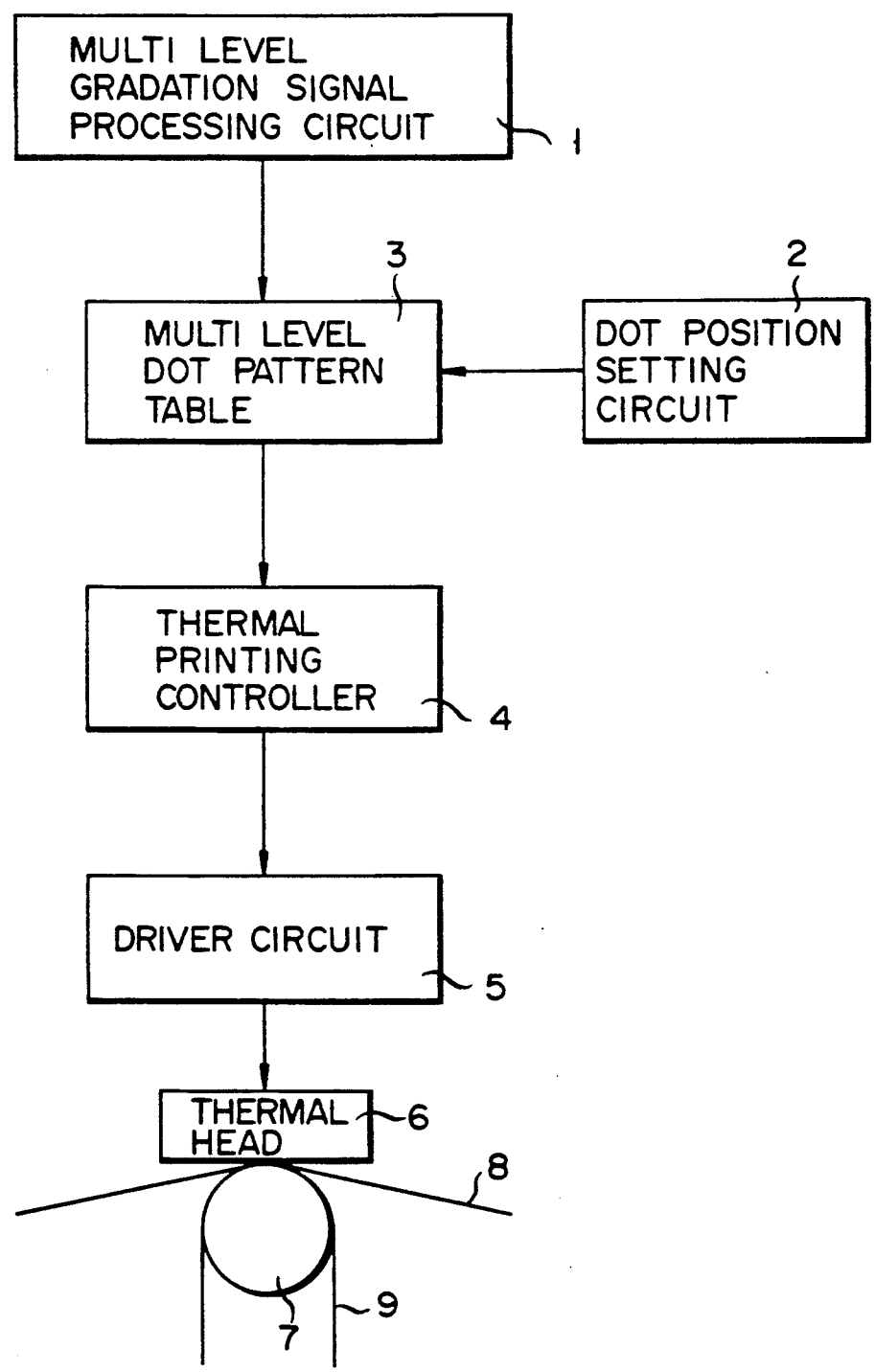
FIG. 46 is a block diagram showing a scheme of the halftone image printing device, which is the seventh embodiment of this invention.

The scheme of a thermal printer designed on the basis of the principle as mentioned above will be described referring to FIG. 46. The output signals from multilevel gradation signal processing circuit 1 and dot position setting circuit 2 are applied to multilevel dot pattern table 3. The output signal of multilevel dot pattern table 3 is fed to driver circuit 5 via thermal printing controller 4. Thermal head 6 thermally melts the ink of ink ribbon 8 and transfers it onto paper 9, while making pressure contact with paper 9 via ink ribbon 8.

Multilevel gradation signal processing circuit 1 appropriately processes the halftone image signal so as to match the printer. The halftone image signal is derived from, for example, the scanner and the image memory, or comes from external devices through the transmission system. The image scanner optically scans the original picture to read out the picture information, and A/D converts the signal representing the picture information. The image memory stores the image signal for each picture element. More specifically, in case that each picture element contained in the signal input to multilevel gradation signal processing circuit 1 is composed of a 2×2 square dot matrix, as indicated by "$\bigcirc$" and "$\Delta$" symbols in FIG. 47, each picture element must be matched with the picture element size ($2\sqrt{2} \times 2\sqrt{2}$), the picture element configuration (quasi-diamond-shaped) and the picture element array of the printer. To this end, of those components of the input signal, the signal component representative of only the picture elements as indicated by circles "$\bigcirc$" is sampled. Further, the averaging or interpolating processing is applied to the signal of a "$\bigcirc$" picture element, in connection with the signal levels of the picture elements located near that "$\bigcirc$" picture element. Multilevel gradation signal processing circuit 1 executes such processing.

Dot position setting circuit 2 is provided for digital printing or halftone printing, and sets dot positions in the dot matrix of each picture element. In the line printer, this circuit 2 operates in synchronism with the dot counter for the horizontal scanning and the line counter for the vertical scanning. If necessary, it operates at the same clock timing as that for the image signal inputting in the multilevel gradation signal processing circuit 1, to sample the signal in order to modify the picture element array and the picture element configuration, as described above.

Multilevel dot pattern table 3 is a key component of this embodiment; it stores dot patterns for gradation levels, as shown in FIG. 44, and the amounts of energy injected to the dots in the dot pattern, i.e., table 3 stores multilevel dot patterns. A ROM, for example, is used for this table. This table 3 produces the injected energy data of the dot, which is contained in the dot pattern of the gradation level indicated by the signal from multilevel gradation signal processing circuit 1, and is located at the position as set by dot position setting circuit 2.

Thermal printing controller 4, coupled with driver circuit 5, controls the width and amplitude of the pulse for each dot, which is applied to the thermal head 6. For this control, the signal from multilevel dot pattern table 3 is used.

Driver circuit 5 is an IC circuit including shift register, latch circuit, gates and driver (which are not shown) and mounted on the board of thermal head 6. The cooperation of drive circuit 5 and thermal printing controller 4 is used for compensating for the heat accumulation in the conventional thermal printing device of the ink melting type. In this embodiment, it is used for the energy control for the expression of gradation.

When the thermal printer with such an arrangement is used for printing based on dot matrix, as discussed above in detail, the energy-concentrated dots are not aligned in the vertical scanning direction. The image obtained has a high quality and is free from unpleasant texture noise. Additionally, since the energy-concentrated dots are distributed in different vertical scanning rows, the number of times that current is fed to specific heating resistors is reduced; thus, the life of the thermal head is lengthened.

As recalled, the seventh embodiment employs the quasi-diamond-shaped matrix for the dot matrix making up the picture element. The same effects can be obtained with a rectangular or square dot matrix, if the picture elements are appropriately arrayed. An eighth embodiment of such possible picture element arrays is illustrated in FIG. 48. In this instance, each picture element consists of a square matrix of 3×3. In this picture element array, the picture element matrices are not aligned in a line vertically and horizontally. In the two adjacent, upper and lower rows of picture elements, the low row is staggered from the upper row by shifting the row either one dot to the left or 2 dots to the right. For this reason, the energy concentrated dots are never vertically aligned. FIG. 48 shows an array of printing dots using the dot patterns each having the printing dot at the center of the 3×3 dot matrix. From this picture element array, it can be seen that the same effects as those of the seventh embodiment can be attained.

Figure 49A:
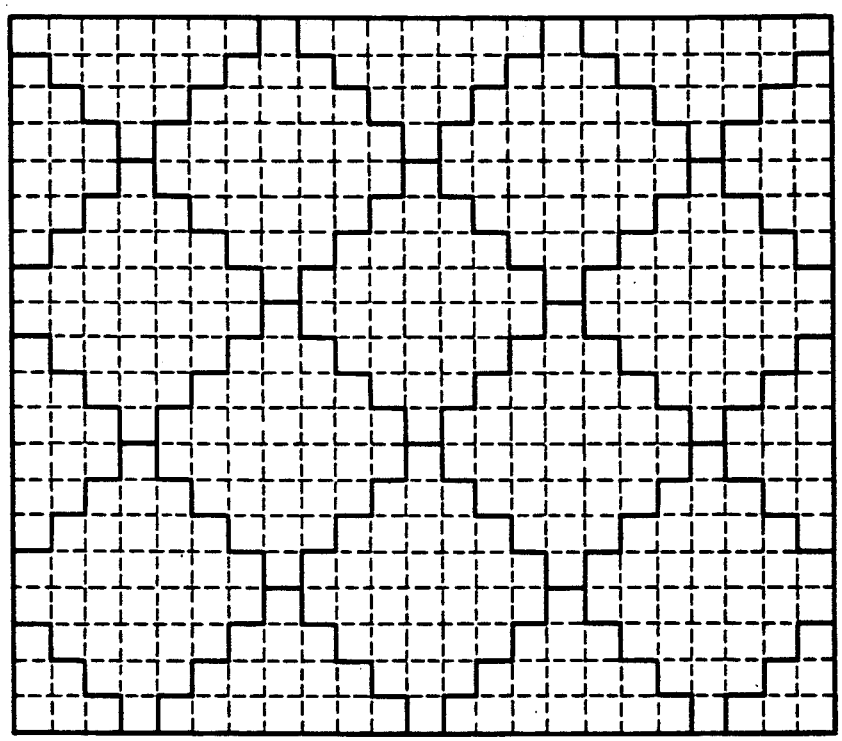
FIG. 49A shows a matrix pattern of picture elements, which is used in a ninth embodiment of a halftone image printing device according to this invention.
Figure 49B:
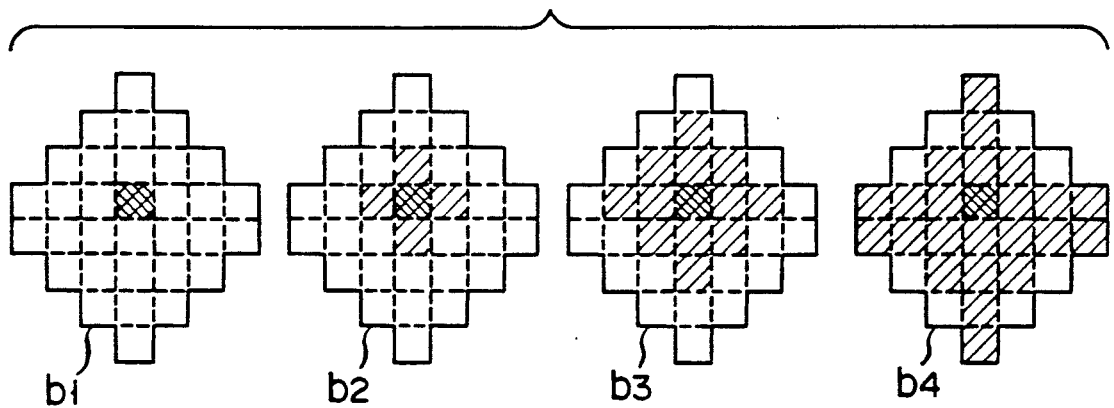

FIG. 49A shows an array of picture elements according to a ninth embodiment of this invention. In this embodiment, the picture element is composed of a quasidiamond-shaped matrix of $4\sqrt{2} \times 4\sqrt{2}$ which is larger than that of the seventh embodiment. In this case also, each horizontal picture element row is staggered by one-half picture element from the adjacent row. Dot patterns b1 to b4 as shown in FIG. 49B are assigned to the different density levels.

Dot pattern b1 contains one printing dot at the center of the matrix. Dot pattern b2 has four dots on the top, bottom, left and right of this center dot. Dot pattern b3 uses eight additional dots around the circumference of the five dots of pattern b2, for a total of thirteen dots. Dot pattern b4 uses additional dots around the thirteen dots of pattern b3, for a total of 24 dots. Even with these dot patterns, the same effects as those of the seventh embodiment can be obtained.

FIG. 50A shows an array of picture elements according to a tenth embodiment of this invention. In this embodiment, a cross-like dot matrix of five dots makes up one picture element. The picture elements are not aligned successively in the horizontal and vertical directions, but are arrayed in the diagonal directions. The dot patterns as shown in FIG. 50B are assigned to different density levels.

Dot pattern c1 contains one printing dot at the center. Dot pattern c2 uses one dot above the center dot of dot pattern c1, for a total of two dots. Dot pattern c3 contains printing dots at other locations than that below the center dot. Also in this embodiment, in the two adjacent dot rows including the energy-concentrated dots, the energy-concentrated dots are not aligned vertically, thus preventing generation of the lattice-like texture noise.

Figure 51A:
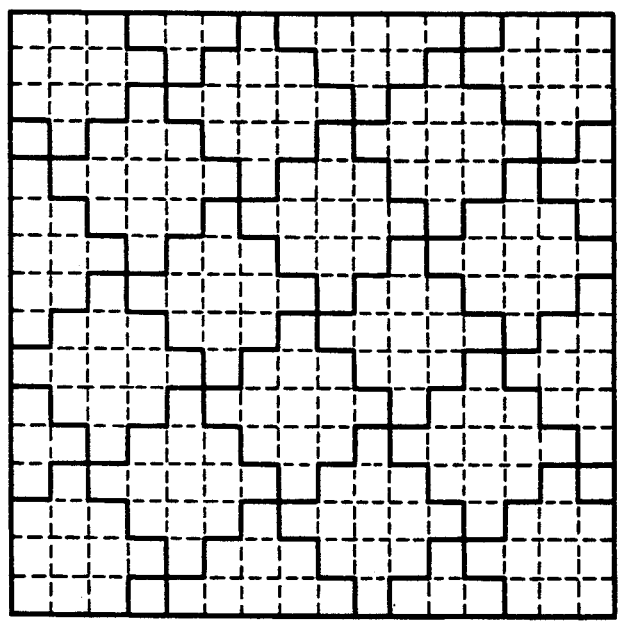
FIG. 51A shows a matrix pattern of picture elements, which is used in an eleventh embodiment of a halftone image printing device according to this invention.
Figure 51B:
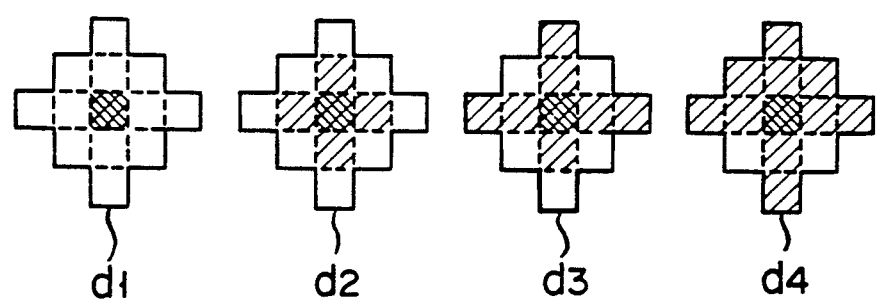
FIG. 51B shows dot patterns for four optical densities, which are used in the eleventh embodiment.

FIG. 51A shows an array of picture elements according to an eleventh embodiment of this invention. A quasi-diamond-like matrix of 13 dots makes up a picture element. As in the tenth embodiment, the picture elements are not aligned vertically and horizontally, but arrayed in the diagonal directions. Dot patterns d1 to d4, as shown in FIG. 51B, are assigned to different density levels, respectively.

Dot pattern d1 contains one printing dot at the center of the dot matrix. Dot pattern d2 is a crosslike pattern in which additional four dots are arrayed around the center dot of dot pattern d1. Dot pattern d3 adds three dots to the top, right and left of the dot pattern d3, for a total of eight dots. Dot pattern d4 is a dot pattern in which three additional dots are applied to the dot pattern d3, for a total of eleven dots. The same effects as those of the tenth embodiment are attainable.

It should be understood that this invention is not limited to the above specific embodiments, but may variously be changed and modified within the scope of this invention. For example, the picture elements and the dot patterns may be arrayed, rotated by 90°, 180° and 270°. The pattern size may be increased. Additionally, this invention is applicable not only for a thermal transfer printer of the ink melting-type, but also for a thermal transfer printer of the ink subliming-type, a thermal printer using a thermo-sensitive paper, an ink jet printer, or an electrophotography printer of digital type.

As described above, according to the present invention, there is provided a thermal printing apparatus which can increase the number of provided density levels without increasing the number of dots of a dot matrix constituting a pixel.

What is claimed is:

1. A halftone image printing device for printing an image formed of an array of picture elements, each picture element being formed of a dot matrix in which a predetermined dot or dots included in a predetermined dot pattern are printed, comprising:

means for receiving halftone image data denoting halftone gradations of each picture element;

means for generating dot pattern information for the picture element according to the halftone image data, the dot pattern information denoting a shape of the dot pattern forming the dot matrix and a printing energy of each printing dot included in the dot pattern, the dot pattern information being generated such that a predetermined dot located in a predetermined position in each dot matrix has a greatest printing energy of the printing dots in that dot matrix;

said means for generating first dot pattern information, including means for generating first dot pattern information, denoting a first dot located at a center of the picture element which is to be printed when a gradation level of the picture element is low; means for generating second dot pattern information denoting the first dot and a second dot or dots adjacent to the first dot either horizontally or vertically which are to be printed when the gradation level of the picture element is medium; and means for generating a third dot pattern information denoting the first and second dots and a third dot or dots adjacent to the first dot either horizontally or vertically which are to be printed when the gradation level of the picture element is high; and means for thermally printing the picture element in accordance with the dot pattern information.

* * * * *